United States Patent
Mukherjee et al.

(10) Patent No.: US 10,716,142 B2
(45) Date of Patent: *Jul. 14, 2020

(54) FIRST COMMUNICATION DEVICE, SECOND COMMUNICATION DEVICE AND METHODS THEREIN, FOR DETERMINING ONE OR MORE PARAMETERS FOR TRANSMITTING ON AN UPLINK CONTROL CHANNEL

(71) Applicant: Telefonaktiebolaget LM Ericsson (publ), Stockholm (SE)

(72) Inventors: Amitav Mukherjee, Fremont, CA (US); Oskar Drugge, Hjärup (SE); Henrik Sahlin, Mölnlycke (SE); Henning Wiemann, Aachen (DE); Emma Wittenmark, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 92 days.

This patent is subject to a terminal disclaimer.

(21) Appl. No.: 15/844,128

(22) Filed: Dec. 15, 2017

(65) Prior Publication Data

US 2018/0110071 A1    Apr. 19, 2018

Related U.S. Application Data

(63) Continuation of application No. 15/433,684, filed on Feb. 15, 2017, now Pat. No. 9,942,919, which is a
(Continued)

(51) Int. Cl.
*H04W 74/08* (2009.01)
*H04W 16/14* (2009.01)
(Continued)

(52) U.S. Cl.
CPC ....... *H04W 74/0808* (2013.01); *H04W 16/14* (2013.01); *H04W 72/0413* (2013.01); *H04W 72/1268* (2013.01); *H04W 74/006* (2013.01)

(58) Field of Classification Search
CPC .............................. H04W 84/18; H04W 84/12
See application file for complete search history.

(56) References Cited

U.S. PATENT DOCUMENTS

| | | | |
|---|---|---|---|
| 2012/0008626 A1* | 1/2012 | Brederveld | G06Q 10/087 370/392 |
| 2013/0279433 A1* | 10/2013 | Dinan | H04W 52/146 370/329 |

(Continued)

FOREIGN PATENT DOCUMENTS

| | | | |
|---|---|---|---|
| WO | 2015066343 A1 | 5/2015 | |
| WO | 2015191963 A1 | 12/2015 | |

(Continued)

OTHER PUBLICATIONS

3GPP, "3rd Generation Partnership Project; Technical Specification Group Radio Access Network; Evolved Universal Terrestrial Radio Access (E-UTRA); Medium Access Control (MAC) protocol specification (Release 12)", 3GPP TS 36.321 V12.1.0, Mar. 2014, 1-57.

(Continued)

*Primary Examiner* — Zhiren Qin
(74) *Attorney, Agent, or Firm* — Murphy, Bilak & Homiller, PLLC

(57) ABSTRACT

A first communication device determines one or more parameters for transmitting on an uplink control channel in an unlicensed band to a second communication device operating in a wireless communications network. The one or more parameters comprise an indication of a duration of a channel sensing period. The first communication device then transmits on the uplink control channel to the second communication device, by applying the determined one or more (Continued)

parameters. According to a method performed by the second communication device operating in the wireless communications network, the second communication device determines the one or more parameters. The second communication device then initiates transmitting the determined one or more parameters to the first communication device.

21 Claims, 13 Drawing Sheets

Related U.S. Application Data continuation of application No. PCT/SE2016/051299, filed on Dec. 21, 2016.

(60) Provisional application No. 62/296,745, filed on Feb. 18, 2016.

(51) Int. Cl.
*H04W 72/04* (2009.01)
*H04W 72/12* (2009.01)
*H04W 74/00* (2009.01)

(56) References Cited

U.S. PATENT DOCUMENTS

| | | | | |
|---|---|---|---|---|
| 2014/0050185 A1* | 2/2014 | Hooli | ............ | H04L 5/0053 370/329 |
| 2014/0219083 A1* | 8/2014 | Mandyam | ............ | H04L 65/4061 370/230 |
| 2015/0373741 A1* | 12/2015 | Yerramalli | ............ | H04W 74/0808 370/336 |
| 2016/0099799 A1* | 4/2016 | Bashar | ............ | H04W 72/02 370/280 |
| 2016/0135143 A1* | 5/2016 | Won | ............ | H04W 72/005 370/312 |
| 2016/0174215 A1* | 6/2016 | Zhang | ............ | H04W 72/0446 370/329 |
| 2016/0192396 A1* | 6/2016 | Ng | ............ | H04W 74/0808 370/329 |
| 2016/0262188 A1 | 9/2016 | Damnjanovic et al. | | |
| 2016/0278049 A1* | 9/2016 | Nory | ............ | H04L 1/1896 |
| 2016/0302184 A1* | 10/2016 | Belleschi | ............ | H04L 5/0053 |
| 2016/0338050 A1* | 11/2016 | Kim | ............ | H04W 72/0446 |
| 2017/0027002 A1* | 1/2017 | Yerramalli | ............ | H04W 74/004 |
| 2017/0048861 A1* | 2/2017 | Choi | ............ | H04L 1/1887 |
| 2017/0093545 A1 | 3/2017 | Sadek et al. | | |
| 2017/0094681 A1* | 3/2017 | Takeda | ............ | H04W 16/14 |
| 2017/0099664 A1* | 4/2017 | Lunttila | ............ | H04W 72/0446 |
| 2017/0118728 A1* | 4/2017 | Harada | ............ | H04W 52/38 |
| 2017/0126346 A1* | 5/2017 | Chendamarai Kannan | ............ | H04L 5/0053 |
| 2017/0142705 A1* | 5/2017 | Chendamarai Kannan | ............ | H04L 1/1812 |
| 2017/0251499 A1 | 8/2017 | Radulescu et al. | | |
| 2018/0270860 A1* | 9/2018 | Bhorkar | ............ | H04W 72/0406 |

FOREIGN PATENT DOCUMENTS

| | | |
|---|---|---|
| WO | 2015196165 A1 | 12/2015 |
| WO | 2015200090 A1 | 12/2015 |
| WO | 2016017327 A1 | 2/2016 |
| WO | 2017070055 A1 | 4/2017 |

OTHER PUBLICATIONS

3GPP, "3rd Generation Partnership Project; Technical Specification Group Radio Access Network; Evolved Universal Terrestrial Radio Access (E-UTRA); Multiplexing and channel coding (Release 12)", 3GPP TS 36.212 V12.6.0, Sep. 2015, 1-95.

3GPP, "3rd Generation Partnership Project; Technical Specification Group Radio Access Network; Evolved Universal Terrestrial Radio Access (E-UTRA); Physical channels and modulation (Release 12)", 3GPP TS 36.211 V12.3.0, Sep. 2014, 1-124.

3GPP, "3rd Generation Partnership Project; Technical Specification Group Radio Access Network; Evolved Universal Terrestrial Radio Access (E-UTRA); Physical layer procedures (Release 12)", 3GPP TS 36.213 V12.3.0, Sep. 2014, 1-212.

Unknown, Author, "Channel Access for the Support of LAA UL", Nokia Networks et al., 3GPP TSG RAN WG1 Meeting #84, R1-160914, St. Julian's, Malta, Feb. 15-19, 2016, 1-7.

Unknown, Author, "Lbt schemes in LAA UL", LG Electronics, 3GPP TSG RAN WG1 meeting #84, R1-160630, St Julian's, Malta, Feb. 15-19, 2016, 1-10.

Hiertz, Guido R, et al., "Analysis of IEEE 802.11E for QoS Support in Wireless LANs", The Evolution of Wireless LANS and PANS, Dec. 2003, pp. 1-11.

Unknown, Author, "Discussion on PRACH for eLAA UL", 3GPP TSG RAN WG1 Meeting #84, R1-160950, St Julian's, Malta, Feb. 15-19, 2016, pp. 1-5.

Unknown, Author, "Discussion on UL grant for LAA", 3GPP TSG RAN WG1 Meeting #80bis, R1-152095, Belgrade, Serbia, Apr. 20-24, 2015, pp. 1-5.

Unknown, Author, "UL LBT and DL/UL Frame Structure for LAA", 3GPP TSG RAN WG1 Meeting #82, R1-154574, Beijing, China, Aug. 25-28, 2015, pp. 1-6.

* cited by examiner

Aggregated bandwidth of 100 MHz

FIRST COMMUNICATION DEVICE, SECOND COMMUNICATION DEVICE AND METHODS THEREIN, FOR DETERMINING ONE OR MORE PARAMETERS FOR TRANSMITTING ON AN UPLINK CONTROL CHANNEL

TECHNICAL FIELD

Embodiments herein relate to a first communication device and methods therein for handling transmitting on an uplink control channel in an unlicensed band. Embodiments herein further relate to a second communication device and methods therein for determining the one or more parameters for the first communication device to transmit on the uplink control channel. Embodiments herein further relate to computer programs and computer-readable storage mediums, having stored thereon the computer programs to carry out these methods.

BACKGROUND

Wireless devices such as terminals are also known as e.g., User Equipments (UE), terminals, mobiles, wireless terminals and/or mobile stations. Wireless devices are enabled to communicate wirelessly in a cellular communications network or wireless communication system, sometimes also referred to as a cellular radio system or cellular network. The communication may be performed, e.g., between two wireless devices, between a wireless device and a regular telephone and/or between a wireless device and a server via a Radio Access Network (RAN) and possibly one or more core networks, comprised within the cellular communications network.

Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which may be divided into cell areas, wherein each cell area may be served by an access node such as a base station, e.g., a Radio Base Station (RBS), which sometimes may be referred to as e.g., evolved NodeB "eNB", "eNodeB", "NodeB", "B node", or BTS (Base Transceiver Station), depending on the technology and terminology used. The base stations may be of different classes such as e.g., macro eNodeB, home eNodeB or pica base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE controlled by the radio base station.

The 3GPP Release 13 (Rel-13) feature "Licensed-Assisted Access" (LAA) allows an LTE equipment, such as a communication device, to also operate in the unlicensed 5 Gigahertz (GHz) radio spectrum. The unlicensed 5 GHz spectrum may be used as a complement to the licensed spectrum. A Release 14 3GPP Rel-14 work item may add UL transmissions to LAA. Accordingly, communication devices may connect in the licensed spectrum, through e.g., a primary cell or PCell, and may use carrier aggregation to benefit from additional transmission capacity in the unlicensed spectrum, through e.g., a secondary cell or SCell. Standalone operation of LTE in unlicensed spectrum may also be possible and is under development by the MuLTEfire Alliance.

Regulatory requirements, however, may not permit transmissions in the unlicensed spectrum without prior channel sensing. Since the unlicensed spectrum may be shared with other radios of similar or dissimilar wireless technologies, a so called Listen-Before-Talk (LBT) method may need to be applied. LBT may involve sensing the medium for a predefined minimum amount of time and backing off if the channel is busy. Today, the unlicensed 5 GHz spectrum is mainly used by equipment implementing the IEEE 802.11 Wireless Local Area Network (WLAN) standard. This standard is known under its marketing brand "Wi-Fi."

LTE

LTE may use Orthogonal Frequency Division Multiplexing (OFDM) in the DL and Discrete Fourier Transform (DFT)-spread OFDM, also referred to as Single-Carrier Frequency Division Multiple-Access (SC-FDMA), in the UL. The basic LTE DL physical resource may thus be seen as a time-frequency grid as illustrated in FIG. 1, where each resource element corresponds to one OFDM subcarrier during one OFDM symbol interval. The UL subframe may have the same subcarrier spacing as the DL, and the same number of SC-FDMA symbols in the time domain as OFDM symbols in the DL. The subcarrier spacing has been chosen to be 15 kiloHertz (kHz), as shown.

In the time domain, LTE DL transmissions are organized into radio frames of 10 milliseconds (ms), each radio frame consisting of ten equally-sized subframes of length Tsubframe=1 ms as shown in FIG. 2, which illustrates the LTE time-domain structure. Each subframe comprises two slots of duration 0.5 ms each, and the slot numbering within a frame may range from 0 to 19. For normal cyclic prefix, one subframe may consist of 14 OFDM symbols. The duration of each symbol may be approximately 71.4 microseconds (μs).

Furthermore, the resource allocation in LTE may typically be described in terms of resource blocks, where a resource block corresponds to one slot, 0.5 ms, in the time domain and 12 contiguous subcarriers in the frequency domain. A pair of two adjacent resource blocks in the time direction, 1.0 ms, may be known as a resource block pair. Resource blocks may be numbered in the frequency domain, starting with 0 from one end of the system bandwidth.

Downlink transmissions may be dynamically scheduled, i.e., in each subframe the base station may transmit control information about which terminals data is transmitted to, and upon which resource blocks the data is transmitted, in the current DL subframe. This control signaling may be typically transmitted in the first 1, 2, 3 or 4 OFDM symbols in each subframe, and the number n=1, 2, 3 or 4 is known as the Control Format Indicator (CFI). The DL subframe may also contain common reference symbols, which may be known to the receiver, and used for coherent demodulation of e.g., the control information. A DL system with CFI=3 OFDM symbols as control region is illustrated in FIG. 3, which illustrates a normal DL subframe. The control region in FIG. 3 is shown as comprising control signaling, indicated by checkered squares, reference symbols, indicated by striped squares, and unused symbols, indicated by white squares. The reference symbols shown in the above FIG. 3 are Cell-specific Reference Symbols (CRS) and they may be used to support multiple functions including fine time and frequency synchronization and channel estimation for certain transmission modes.

Uplink transmissions may be dynamically scheduled, i.e., in each downlink subframe the base station may transmit control information about which terminals should transmit data to the eNB in subsequent subframes, and upon which resource blocks the data may be transmitted. The uplink resource grid may be comprised of data and uplink control information in the Physical Uplink Shared Channel (PUSCH), uplink control information in the Physical Uplink Control Channel (PUCCH), and various reference signals such as Demodulation Reference Signals (DMRS) and Sounding Reference Signals (SRS). DMRS may be used for coherent demodulation of PUSCH and PUCCH data, whereas SRS may not be associated with any data or control information but may be generally used to estimate the uplink channel quality for purposes of frequency-selective scheduling. An example uplink subframe according to Rel-12 is shown in FIG. 4. Note that UL DMRS and SRS are time-multiplexed into the UL subframe, and SRS may always be transmitted in the last symbol of a normal UL subframe. In FIG. 4, frequency multiplexing is used to separate the SRS from a first user (UE 1 SRS), from that from a second user (UE 2 SRS). The PUSCH DMRS may be transmitted once every slot for subframes with normal cyclic prefix, and may be located in the fourth and eleventh SC-FDMA symbols.

From LTE Rel-11 onwards, DL or UL resource assignments may also be scheduled on the enhanced Physical Downlink Control Channel (EPDCCH). For Rel-8 to Rel-10, only the Physical Downlink Control Channel (PDCCH) may be available. Resource grants may be UE specific and may be indicated by scrambling the Downlink Control Information (DCI) Cyclic Redundancy Check (CRC) with the UE-specific Cell Radio Network Temporary Identifier (C-RNTI).

LTE PUCCH

In LTE, the PUCCH may be placed at the edges of the system bandwidth in the frequency domain. Each PUCCH transmission in one subframe may comprise a single RB at or near one edge of the system bandwidth in the first slot, followed by a second RB at or near the opposite edge of the system bandwidth in the next slot. Multiple UEs may be multiplexed onto the same PUCCH RBs, with user separation achieved via code division multiplexing in the frequency and/or time domain. The PUCCH may carry control information comprising Channel Quality Information (CQI), Hybrid Automatic Repeat reQuest (HARQ) ACKnowledgment/Negative ACKnowledgment (ACK/NACK) and uplink scheduling requests. See 3GPP TS36.211 Section 5.4.

Carrier Aggregation

The LTE Release 10 standard may support bandwidths larger than 20 MegaHertz (MHz). One important requirement on LTE Release 10 may be to assure backward compatibility with LTE Release 8. This may also include spectrum compatibility. That may imply that an LTE Release 10 carrier, wider than 20 MHz, may appear as a number of LTE carriers to an LTE Release 8 terminal. Each such carrier may be referred to as a Component Carrier (CC). In particular, for early LTE Release 10 deployments, it may be expected that there may be a smaller number of LTE Release 10-capable terminals compared to many LTE legacy terminals. Therefore, it may be necessary to assure an efficient use of a wide carrier also for legacy terminals, i.e., that it may be possible to implement carriers where legacy terminals may be scheduled in all parts of the wideband LTE Release 10 carrier. The straightforward way to obtain this may be by means of Carrier Aggregation (CA). CA implies that an LTE Release 10 terminal may receive multiple CC, where the CC may have, or at least may have the possibility to have, the same structure as a Release 8 carrier. CA is illustrated in FIG. 5, where 5 carriers of 20 MHz each are aggregated to form a bandwidth of 100 MHz. A CA-capable communication device, such as a UE, may be assigned a Primary Cell (PCell) which is always activated, and one or more Secondary Cells (SCells), which may be activated or deactivated dynamically.

The number of aggregated CC as well as the bandwidth of the individual CC may be different for UL and DL. A symmetric configuration refers to the case where the number of CCs in DL and UL is the same, whereas an asymmetric configuration refers to the case that the number of CCs is different. It may be noted that the number of CCs configured in a cell may be different from the number of CCs seen by a terminal: A terminal may for example support more DL CCs UL CCs, even though the cell is configured with the same number of UL and DL CCs.

Wireless Local Area Network (WLAN)

In typical deployments of WLAN, Carrier Sense Multiple Access with Collision Avoidance (CSMA/CA) may be used for medium access. This means that the channel may be sensed to perform a Clear Channel Assessment (CCA), and a transmission may be initiated only if the channel is declared as Idle. In case the channel is declared as Busy, the transmission may be essentially deferred until the channel is deemed to be Idle.

A general illustration on an example of the Listen Before Talk (LBT) mechanism or process is shown in FIG. 6. After a Wi-Fi station (STA) A may transmit a data frame to a station B, station B transmits the ACK frame back to station A with a delay of 16 μs. Such an ACK frame may be transmitted by station B without performing a LBT operation. To prevent another station interfering with such an ACK frame transmission, a station may defer for a duration of 34 μs, referred to as Distributed coordination function Interframe Space (DIFS), after the channel is observed to be occupied before assessing again whether the channel is occupied. Therefore, a station that wishes to transmit data may first perform a CCA by sensing the medium for a fixed duration DIFS. If the medium is idle, then the station may assume that it may take ownership of the medium and begin a frame exchange sequence. If the medium is busy, the station may wait for the medium to go idle, defer for DIFS, and wait for a further random backoff period.

In the above basic protocol, when the medium may become available, multiple Wi-Fi stations may be ready to transmit, which may result in collision. To reduce collisions, stations intending to transmit may select a random backoff counter and defer for that number of slots channel idle times. The random backoff counter may be selected as a random integer drawn from a uniform distribution over the interval of [0, Contention Window (CW)]. The default size of the random backoff contention window, CWmin, may be set in the IEEE specs. Note that collisions may still happen even under this random backoff protocol when there may be many stations contending for the channel access. Hence, to avoid recurring collisions, the backoff contention window size CW may be doubled whenever the station may detect a collision of its transmission up to a limit, CWmax, which may also be set in the IEEE specs. When a station succeeds in a data transmission without collision, it may reset its random backoff contention window size back to the default value CWmin.

Licensed-Assisted Access (LAA) in Unlicensed Spectrum

Up to now, the spectrum used by LTE may be dedicated to LTE. This may have the advantage that the LTE system may not need to care about the coexistence issue and the spectrum efficiency may be maximized. However, the spectrum allocated to LTE is limited, which may not meet the ever increasing demand for larger throughput from applications and/or services. Therefore, Rel-13 extended LTE to exploit unlicensed spectrum in addition to licensed spectrum. Unlicensed spectrum may, by definition, be simultaneously used by multiple different technologies. Therefore, LTE may need to consider the coexistence issue with other systems such as IEEE 802.11 (Wi-Fi). Operating LTE in the same manner in unlicensed spectrum as in licensed spectrum may seriously degrade the performance of Wi-Fi, as Wi-Fi may not transmit once it detects the channel is occupied.

Furthermore, one way to utilize the unlicensed spectrum reliably may be to transmit particularly relevant control signals and channels on a licensed carrier. That is, as shown in FIG. 7, a UE may be connected to a PCell in the licensed band and one or more SCells in the unlicensed band. Herein, a SCell in unlicensed spectrum is referred to as a Licensed-Access Secondary Cell (LA SCell) or Licensed-Assisted Access Cell. In the case of standalone operation as in MuLTEfire, no licensed cell is available for uplink control signal transmissions. FIG. 7 is a schematic representation illustrating LAA to unlicensed spectrum using LTE carrier aggregation.

The Maximum Channel Occupancy Time (MCOT) of a single DL+UL Transmission Opportunity (TXOP) in unlicensed bands may be limited by regional regulatory restrictions. For example, in Europe, EN Broadband Radio Access Networks (BRAN) is considering the following MCOT rules: a) Specify max TxOP=6 ms available for 100% of the time; b) Specify max TxOP=8 ms is available for 100% of time with a minimum pause of [TBD] µs, in order of hundreds of µs, after a maximum transmission of 6 ms; c) Specify max TxOP=10 ms is available for [TBD3] % of the time.

LBT in 3GPP LAA and MuLTEfire

In Rel-13 LAA, LBT for DL data transmissions may follow a random backoff procedure similar to that of Wi-Fi, with CW adjustments based on Hybrid Automatic Repeat reQuest (HARQ) Negative ACKnowledgment (HACK) feedback. Several aspects of UL LBT were discussed during Release 13. With regard to the framework of UL LBT, the discussion focused on the self-scheduling and cross-carrier scheduling scenarios. UL LBT may impose an additional LBT step for UL transmissions with self-scheduling, since the UL grant itself may require a DL LBT by the eNB. The UL LBT maximum CW size may then be limited to a very low value to overcome this drawback, if random backoff is adopted. Therefore, Release 13 LAA recommended that the UL LBT for self-scheduling should use either a single CCA duration of at least 25 is, similar to a DL Discovery Reference Signal (DRS), or a random backoff scheme with a defer period of 25 µs including a defer duration of 16 us followed by one CCA slot, and a maximum contention window size chosen from X={3, 4, 5, 6, 7}. These options may be also applicable for cross-carrier scheduling of UL by another unlicensed SCell.

A short UL LBT procedure for the case involving cross-carrier scheduling by a licensed PCell remains open for further study. The other option which may be considered is a full-fledged random backoff procedure similar to that used by Wi-Fi STAtions (STAs).

Finally, the case of UL transmissions without LBT when an UL transmission burst follows a DL transmission burst on that respective carrier, with a gap of at most 16 µs between the two bursts, was left open for further study in Rel-14.

An example to illustrate UL LAA LBT and UL transmission when the UL grant is sent on an unlicensed carrier is provided in the schematic diagram of FIG. 8. As shown in the Figure, an eNB transmits an UL grant in a subframe n, in an unlicensed band. The UL grant is represented in the Figure with black rectangles in subframe n. The eNB first performs channel sensing with CCA. The UL grant is for a UE to transmit data in subframe n+4 in the unlicensed band. The UL data transmission is represented in the Figure with black rectangles in subframe n+4. Before starting UL data transmission, the UE also may need to perform channel sensing CCA.

PUCCH in MuLTEfire

Two forms of PUCCH transmission have been defined for MuLTEfire (MF): a short PUCCH (sPUCCH) comprising between two to six symbols in time, and a longer extended PUCCH (ePUCCH), which may span one subframe in time, as shown in FIG. 9. FIG. 9 is a schematic diagram illustrating examples of ePUCCH and sPUCCH within a TXOP in two different MF cells. In FIG. 9, a "U" is used to represent a full UL subframe. Any vertical rectangle of the same dimensions in the Figure represents a subframe. Any vertical rectangle of narrower breadth in the Figure represents a partial subframe. "D" is used to indicate DL. LBT procedure is performed only once at the beginning the TXOP, followed by a DL burst. The sPUCCH may occur immediately after the Downlink Pilot TimeSlot (DwPTS) portion of a partial DL subframe as defined in Rel-13 LAA, while the ePUCCH may be multiplexed with PUSCH transmissions in 1 ms UL subframes. Both sPUCCH and ePUCCH may utilize an interlaced transmission mode based on Block-Interleaved Frequency Division Multiple Access (B-IFDMA). The UL sub-frame containing ePUCCH and PUSCH may also contain a Physical Random Access CHannel (PRACH) preamble. In other examples not depicted in FIG. 9, a TxOP may also be started from a UE side. In such other examples, the LBT may be performed by the UE and the TxOP may start with an UL burst.

Further details regarding any of the above may be found in 3GPP TS 36.211, V12.3.0 (2014-09), 3rd Generation Partnership Project; Technical Specification Group Radio Access Network; Evolved Universal Terrestrial Radio Access (E-UTRA); Physical Channels and Modulation, Release 12, 3GPP TS 36.213, V12.3.0 (2014-09), 3rd Generation Partnership Project; Technical Specification Group Radio Access Network; Evolved Universal Terrestrial Radio Access (E-UTRA); Physical layer procedures, Release 12, 3GPP TS 36.212, V12.6.0 (2015-03), 3rd Generation Partnership Project; Technical Specification Group Radio Access Network; Evolved Universal Terrestrial Radio Access (E-UTRA); Radio Resource Control (RRC), Release 12, and 3GPP TS 36.321, V12.1.0 (2014-03), 3rd Generation Partnership Project; Technical Specification Group Radio Access Network; Evolved Universal Terrestrial Radio Access (E-UTRA); Medium Access Control (MAC) protocol specification, Release 12.

The usage of unlicensed spectrum may provide a way to increase the capacity of a wireless communications network to match an ever growing demand for transmissions. However, since the transmission in unlicensed spectrum is shared, and channel sensing procedures may need to be performed, transmissions may be significantly delayed. Furthermore, with existing methods, transmission in unlicensed spectrum of uplink control information in an uplink control channel, e.g., the LTE PUCCH, to a communication device supporting multiplexing of communication devices, may be unreliable, or unnecessarily delayed, as each of the multiplexed communication devices may need to perform a channel sensing procedure. Hence, while usage of unlicensed spectrum may provide a way to increase the capacity of a wireless communications network, the effectiveness of wireless communications in unlicensed spectrum is currently compromised.

SUMMARY

It is therefore an object of embodiments herein to improve transmission of control information in wireless communications networks. It is a particular object of embodiments herein to improve transmission of an uplink control channel in unlicensed spectrum wireless communications networks.

According to a first aspect of embodiments herein, the object is achieved by a method performed by a first communication device. The first communication device operates in a wireless communications network. The first communication device determines one or more parameters for transmitting on an uplink control channel in an unlicensed band. Transmission is to a second communication device operating in the wireless communications network. The one or more parameters comprise an indication of a duration of a channel sensing period. The first communication device transmits on the uplink control channel to the second communication device 102 by applying the determined one or more parameters.

According to a second aspect of embodiments herein, the object is achieved by a method performed by the second communication device. The second communication device operates in the wireless communications network. The second communication determines the one or more parameters for the first communication device to transmit on the uplink control channel in the unlicensed band to the second communication device. The first communication device operates in the wireless communications network. The one or more parameters comprise the indication of the duration of the channel sensing period. The second communication device initiating transmitting the determined one or more parameters to the first communication device.

According to a third aspect of embodiments herein, the object is achieved by the first communication device. The first communication device is configured to operate in the wireless communications network. The first communication device is further configured to determine the one or more parameters for transmitting on the uplink control channel in the unlicensed band. Transmission is to the second communication device, which is configured to operate in the wireless communications network. The one or more parameters comprise the indication of the duration of the channel sensing period. The first communication device is further configured to transmit on the uplink control channel to the second communication device by applying the determined one or more parameters.

According to a fourth aspect of embodiments herein, the object is achieved by the second communication device configured to operate in the wireless communications network. The second communication device is further configured to determine the one or more parameters for the first communication device to transmit on the uplink control channel in the unlicensed band to the second communication device. The first communication device is configured to operate in the wireless communications network. The one or more parameters comprise the indication of the duration of the channel sensing period. The second communication device is also configured to initiate transmitting the determined one or more parameters to the first communication device.

According to a fifth aspect of embodiments herein, the object is achieved by a computer program. The computer program comprises instructions which, when executed on at least one processor, cause the at least one processor to carry out the method performed by the first communication device.

According to a sixth aspect of embodiments herein, the object is achieved by computer-readable storage medium. The computer-readable storage medium has stored thereon a computer program comprising instructions which, when executed on at least one processor, cause the at least one processor to carry out the method performed by the first communication device.

According to a seventh aspect of embodiments herein, the object is achieved by a computer program. The computer program comprises instructions which, when executed on at least one processor, cause the at least one processor to carry out the method performed by the second communication device.

According to an eighth aspect of embodiments herein, the object is achieved by computer-readable storage medium. The computer-readable storage medium has stored thereon a computer program comprising instructions which, when executed on at least one processor, cause the at least one processor to carry out the method performed by the second communication device.

By the first communication device determining the one or more parameters for transmitting the uplink control channel in the unlicensed band, and then transmitting on the uplink control channel by applying the determined one or more parameters, transmission is enabled to be performed with a more efficient usage of time-frequency resources, and reduced latency. This is because the one or more parameters comprise the indication of the duration of the channel sensing period. Accordingly, instead of applying e.g., a preconfigured, fixed value of the duration of the channel sensing period, which may not be efficient or adequate for every transmission of uplink control information on the uplink control channel, the first communication device may determine the one or more parameters that may be optimal for a more efficient usage of time-frequency resources, and reduced latency in transmitting on the uplink control channel. Therefore, transmission of uplink control channels in unlicensed spectrum, in a wireless communications network is improved, as transmission is performed with a more efficient usage of time-frequency resources, and reduced latency.

BRIEF DESCRIPTION OF THE DRAWINGS

Examples of embodiments herein are described in more detail with reference to the accompanying drawings, and according to the following description.

DETAILED DESCRIPTION

Terminologies

Figure 1:
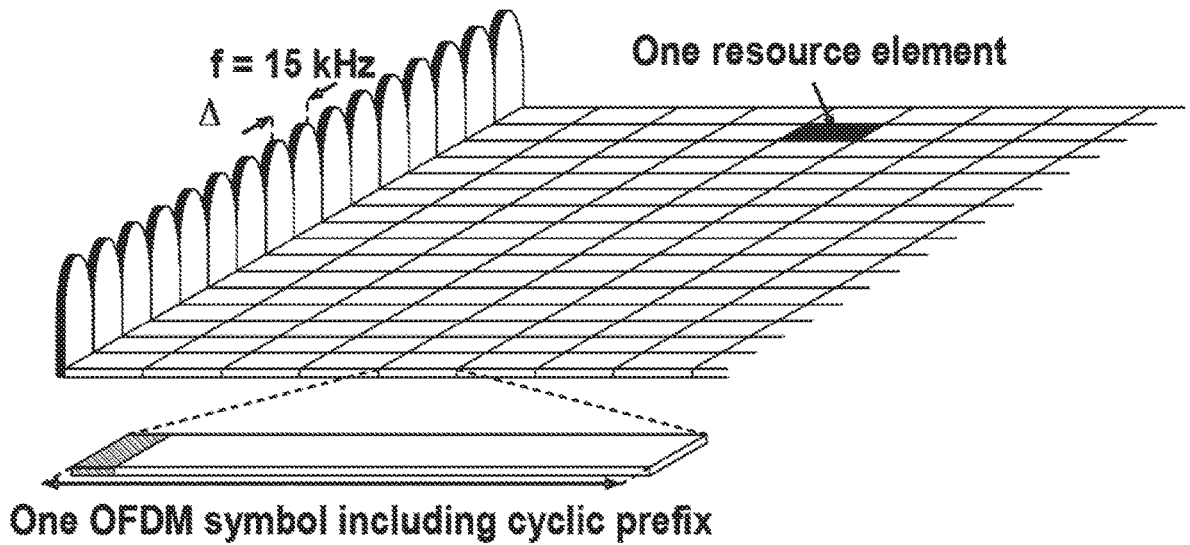
FIG. 1 is a schematic diagram illustrating the basic LTE DL physical resource.
Figure 2:
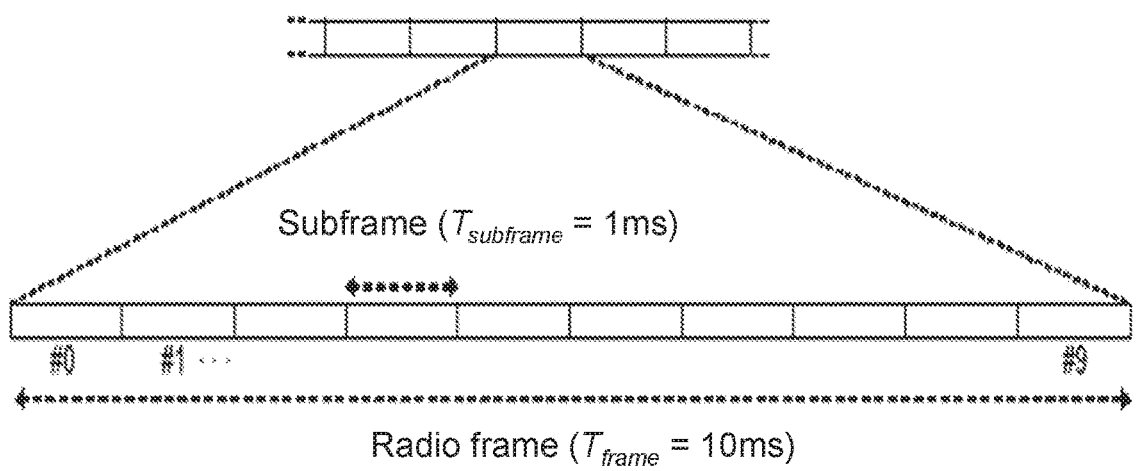
FIG. 2 is a schematic diagram illustrating the LTE time-domain structure.
Figure 3:
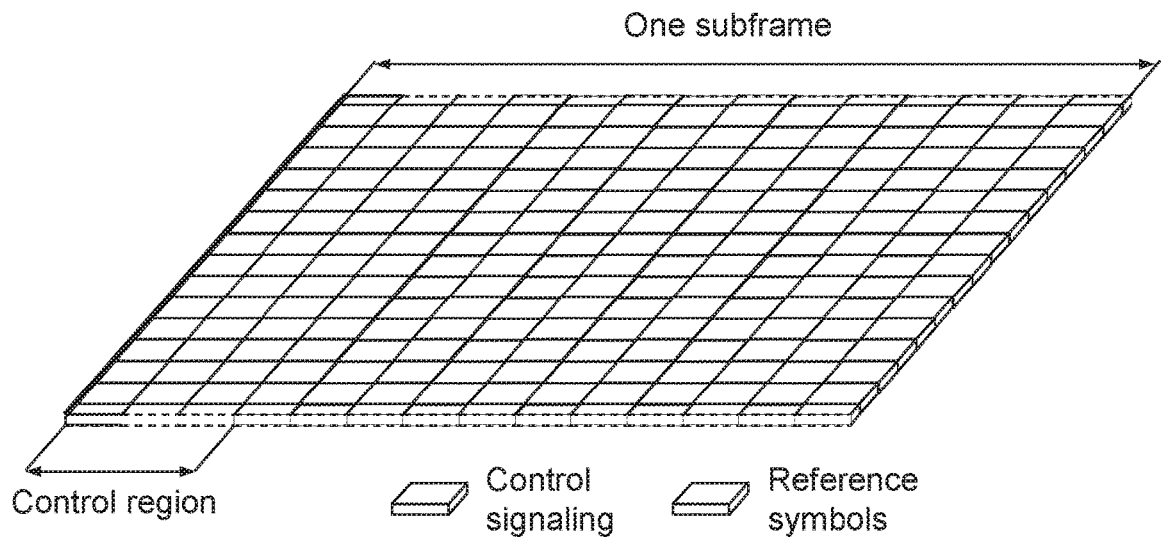
FIG. 3 is a schematic diagram illustrating an example of a normal DL subframe in LTE.
Figure 4:
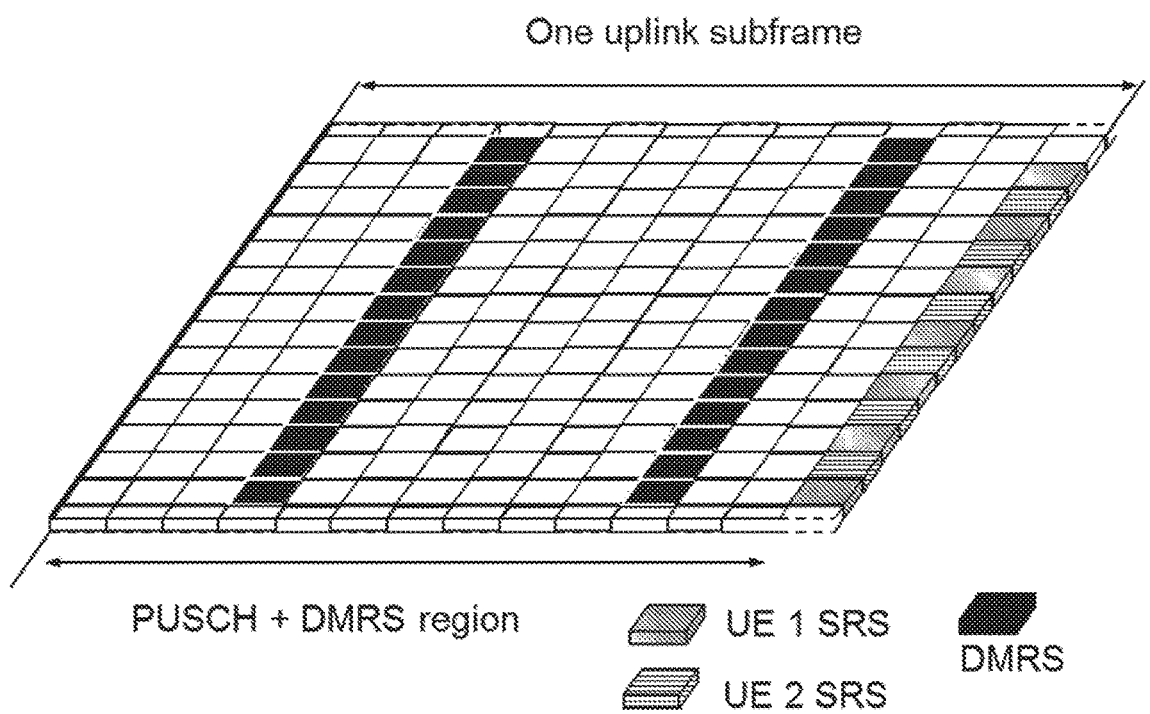
FIG. 4 is a schematic diagram schematic diagram illustrating an example of a Rel-12 UL subframe.
Figure 5:
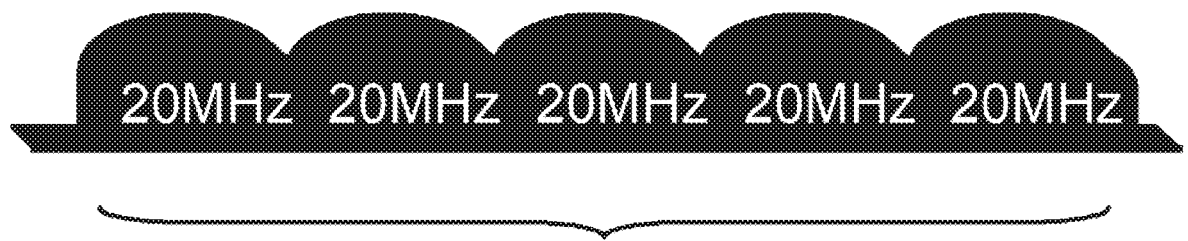
FIG. 5 is a schematic diagram illustrating CA.
Figure 7:
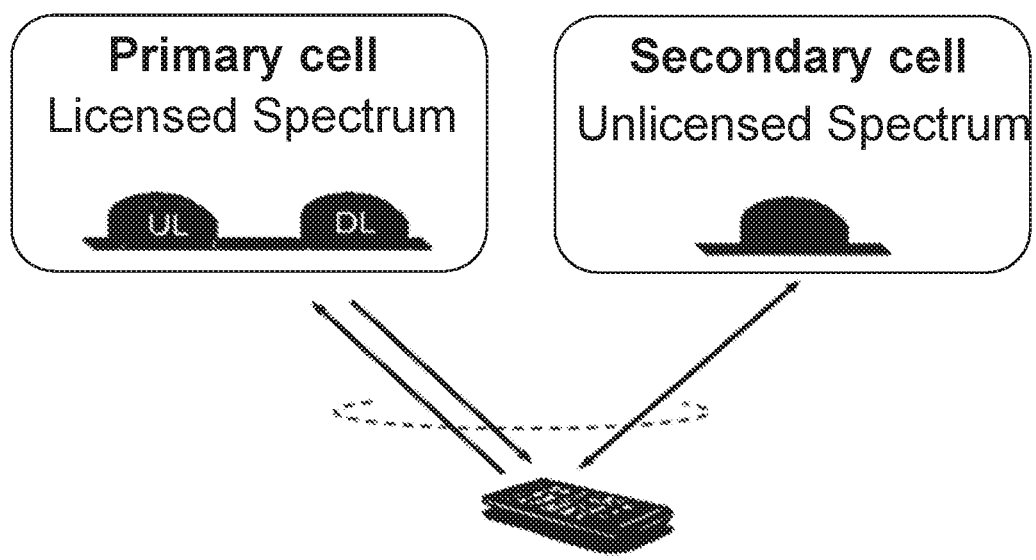
FIG. 7 is a schematic diagram illustrating LAA to unlicensed spectrum using LTE CA.
Figure 6:
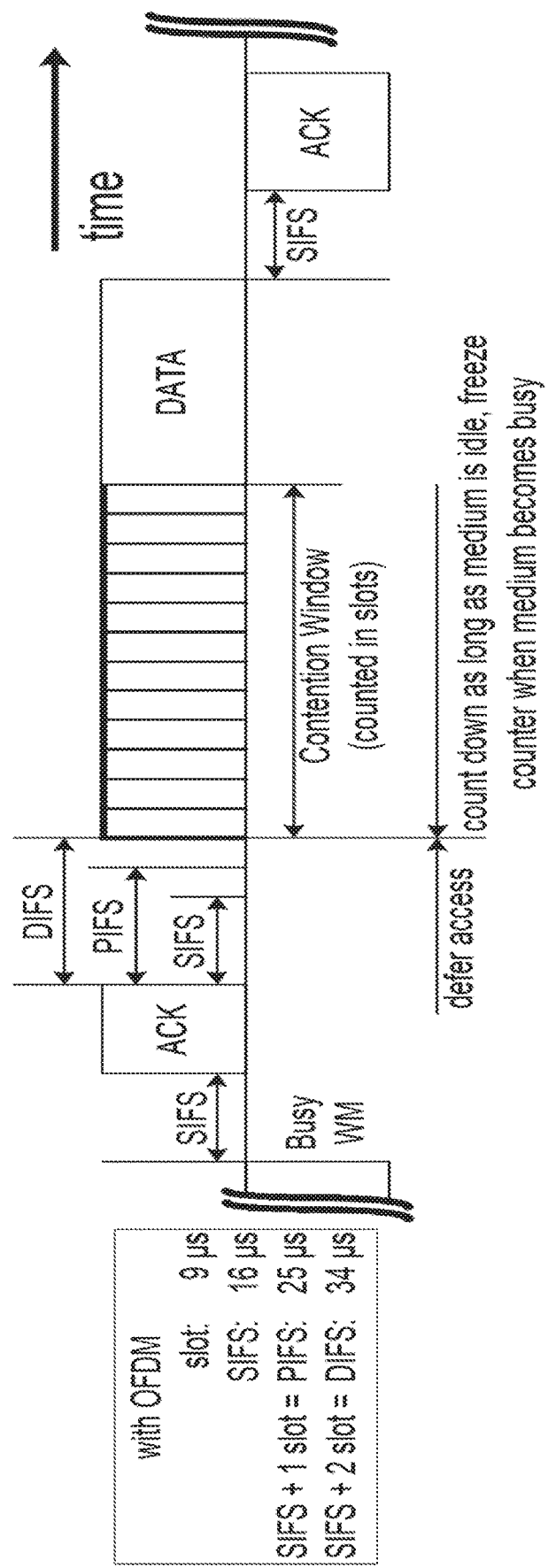
FIG. 6 is a schematic diagram illustrating an example of the LBT mechanism in Wi-Fi.
Figure 8:
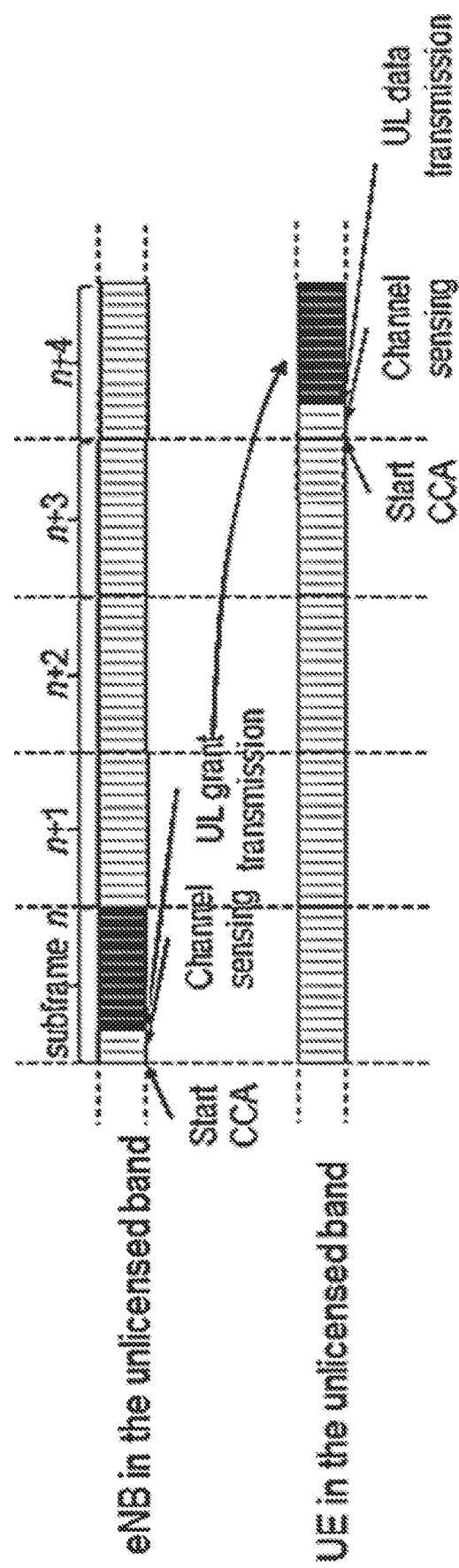
FIG. 8 is a schematic diagram illustrating an example of UL LAA LBT.
Figure 9:
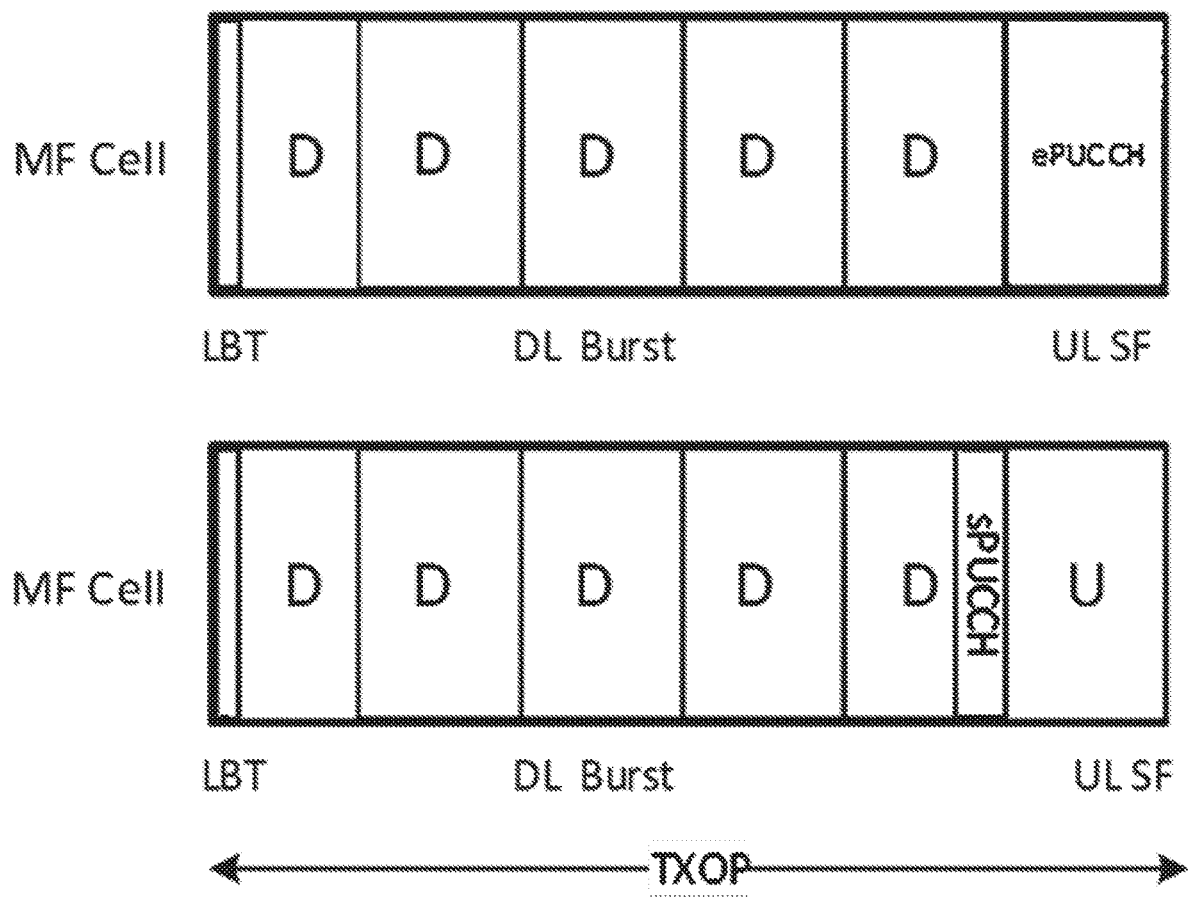
FIG. 9 is a schematic diagram illustrating examples of ePUCCH and sPUCCH within a TXOP.

The following common terminologies are used in the embodiments and are elaborated below:

Radio network node: In some embodiments the non-limiting term radio network node is more commonly used and it refers to any type of network node serving a UE and/or connected to another network node or network element or any radio node from where a UE receives a signal. Examples of radio network nodes are Node B, Base Station (BS), Multi-Standard Radio (MSR) radio node such as MSR BS, eNode B, network controller, Radio Network Controller (RNC), base station controller, relay, donor node controlling relay, Base Transceiver Station (BTS), Access Point (AP), transmission points, transmission nodes, Remote Radio Unit (RRU), Remote Radio Head (RRH), nodes in Distributed Antenna System (DAS) etc.

Network node: In some embodiments a more general term "network node" is used and it may correspond to any type of radio network node or any network node, which communicates with at least a radio network node. Examples of network node are any radio network node stated above, core network node, e.g., Mobile Switching Centre (MSC), Mobility Management Entity (MME), Operational and Maintenance (O&M), Operational Support Systems (OSS), Self Organizing Network (SON), positioning node, e.g., Evolved Serving Mobile Location Centre (E-SMLC), Minimization of Drive Test (MDT) etc.

User equipment: In some embodiments the non-limiting term user equipment (UE) is used and it refers to any type of wireless device communicating with a radio network node in a cellular or mobile communication system. Examples of UE are target device, device to device UE, machine type UE or UE capable of machine to machine communication, PDA, iPad, Tablet, mobile terminals, smart phone, laptop embedded equipment (LEE), laptop mounted equipment (LME), USB dongles etc.

The embodiments herein also apply to the multi-point carrier aggregation systems.

Note that although terminology from 3GPP LTE has been used in this disclosure to exemplify the embodiments herein, this should not be seen as limiting the scope of the embodiments herein to only the aforementioned system. Other wireless systems with similar requirements to those of LTE for LAA or standalone LTE in Unlicensed Spectrum (LTE-U), may also benefit from exploiting the ideas covered within this disclosure.

As part of the development of the embodiments disclosed herein, a problem associated with existing methods will first be identified and discussed.

Different UL LBT schemes may be applicable for sPUCCH and ePUCCH transmissions, depending upon regulatory requirements and the occurrence of the PUCCH relative to a TXOP boundary. Two forms of UL LBT may be applicable to ePUCCH for example: a) a one-shot CCA of 25 µs duration, or b) a random backoff LBT with variable backoff duration. No LBT may be applicable as well. The TXOP duration and boundary may also be transparent to UEs which have not been scheduled for DL or UL reception throughout the TXOP. Furthermore, unlike PUCCH, the PUCCH transmissions may not be explicitly scheduled by the eNB and hence dynamic indication of LBT parameters via UL grants may not be applicable. Prior methods do not establish how a communication device is to transmit information on an uplink control channel, when transmitting in unlicensed spectrum. The details of sPUCCH and ePUCCH LBT schemes and how the eNB and UE may reach a common understanding on the applicable LBT process were open for discussion in the MuLTEfire Alliance Forum. Performance of, for example, no channel sensing, such as application of a Short InterFrame Space (SIFS), may result in collisions with other transmissions. Alternatively, performance of a fixed, pre-defined channel sensing period to all transmissions on plink control channels in unlicensed spectrum may result in unnecessary delays as a result of performance of lengthy channel sensing.

Furthermore, currently, transmissions on uplink control channels from multiple wireless devices which have received data in a same unit of time-frequency resources, e.g., a subframe, may collide with each other, or be unnecessarily delayed, due to the need to perform channel sensing, e.g., LBT, protocols prior to the transmissions. The transmissions on the uplink control channels from the multiplexed wireless devices may then block one another. This results in increased latency, decreased capacity and loss of quality of the transmitted communications.

Embodiments herein may be understood as generally relating to methods for PUCCH LBT. In general, embodiments herein may be understood to relate to LTE in unlicensed bands, Listen-before-talk, and MuLTEfire. Embodiments herein may more particularly relate to methods for configuring and indicating LBT parameters for PUCCH transmissions in unlicensed bands. PUCCH transmissions, or transmission of PUCCH, transmitting the PUCCH, transmission of the PUCCH, or similar expressions may be understood herein to refer to transmissions on the PUCCH. Further particular embodiments herein may relate to PUCCH LBT in systems such as MuLTEfire, Rel-14 LAA, and other versions of LTE in unlicensed bands. The proposed changes may affect L1 and L2.

Embodiments will now be described more fully hereinafter with reference to the accompanying drawings, in which examples are shown. In this section, the embodiments herein will be illustrated in more detail by a number of exemplary embodiments. It should be noted that the exemplary embodiments herein are not mutually exclusive. Components from one embodiment may be tacitly assumed to be present in another embodiment and it will be obvious to a person skilled in the art how those components may be used in the other exemplary embodiments.

Also note that terminology such as eNodeB and UE should be considering non-limiting and does in particular not imply a certain hierarchical relation between the two; in general "eNodeB" could be considered as device 1 and "UE" device 2, and these two devices communicate with each other over some radio channel.

In general, the usage of "first", "second", and/or "third" herein, may be understood to be an arbitrary way to denote different entities, and may be understood to not confer a cumulative or chronological character to the nouns they modify.

Figure 10:
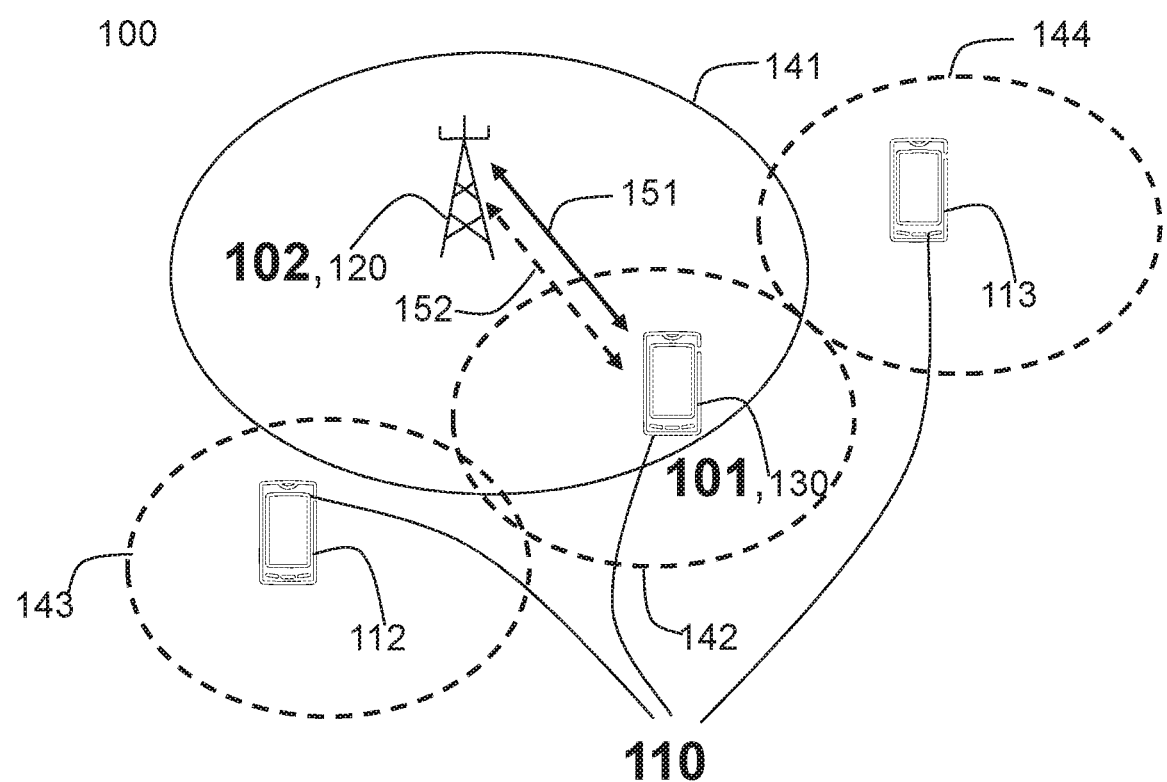
FIG. 10 is a schematic block diagram illustrating embodiments of a wireless communications network, according to embodiments herein.

FIG. 10 depicts an example of a wireless communications network 100, sometimes also referred to as a cellular radio system, cellular network or wireless communications system, in which embodiments herein may be implemented. The wireless communications network 100 may for example be a network such as a Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access (WCDMA), 5G system or any cellular network or system with similar requirements to those of LTE for LAA or standalone LTE in Unlicensed (LTE-U), e.g., an MF system. Thus, although terminology from 3GPP LTE may be used in this disclosure to exemplify embodiments herein, this should not be seen as limiting the scope of the embodiments herein to only the aforementioned system.

The wireless communications network 100 comprises a plurality of communication devices, such as a first communication device 101, and a second communication device 102. The first communication device 101 may be comprised in a group of first communication devices 110. The group of first communication devices 110 may comprise a plurality of first communication devices. In the non-limiting example of FIG. 10, the group of first communication devices 110 comprises the first communication device 101, which may be referred to as a first communication device 101, a second first communication device 112, and a third first communication device 113. Any of the first communication device 101, the second communication device 102, and any of the first communication devices in the group of first communication devices 110 may be a network node such as network node 120 described below, or a wireless device such as wireless device 130 described below. The first communication device 101 is different than the second communication device 102. Typically, the first communication device 101, as well as any of the other first communication devices in the group of first communication devices 110, will be a wireless device such as wireless device 130 described below, and the second communication device 102 will be a network node such as the network node 120. This corresponds to the non-limiting particular example illustrated in FIG. 10. In Device to Device (D2D) communications, all of the first communication devices in the group of first communication devices 110 and the second communication device 102 may be different wireless devices. For example, each of the first communication devices in the group of first communication devices 110 may be a slave wireless device and the second communication device 102 may be a master wireless device.

The wireless communications network 100 may comprise a plurality of network nodes, whereof the network node 120 is depicted in FIG. 10. The network node 120 may be a transmission point such as a radio base station, for example an eNB, an eNodeB, or a Home Node B, a Home eNode B or any other network node capable to serve a wireless device, such as a user equipment or a machine type communication device in the wireless communications network 100. The wireless communications network 100 covers a geographical area, which in some embodiments may be divided into cell areas, wherein each cell area is served by a network node, although one network node may serve one or several cells. In the non-limiting example depicted in FIG. 10, the network node 120 serves a first cell 141, which may be a primary cell. The primary cell 141 is typically in licensed spectrum. In FIG. 10, the network node 120 also serves a second cell 142, a third cell 143, and a fourth cell 144. Each of the second cell 142, the third cell 143, and the fourth cell 144 may be a licensed-assisted access cell, also referred to herein as licensed-assisted access secondary cell, as defined above. Each of the second cell 142, the third cell 143, and the fourth cell 144 are in unlicensed spectrum. The network node 120 may be of different classes, such as, e.g., macro eNodeB, home eNodeB or pico base station, based on transmission power and thereby also cell size. Typically, the wireless communications network 100 may comprise more cells similar to the first cell 131, the second cell 142, the third cell 143, and the fourth cell 144, served by their respective network node. This is not depicted in FIG. 10 for the sake of simplicity. In other examples than those depicted in FIG. 10, wherein the wireless communications network 100 is a non-cellular system, the network node 120 may serve receiving nodes with serving beams. The network node 120 may support one or several communication technologies, and its name may depend on the technology and terminology used. In 3GPP LTE, the network node 120, which may be referred to as eNodeB or even eNB, may be directly connected to one or more core networks.

A wireless device 130, also referred to herein as a user equipment or UE, may be located in the wireless communication network 100. The wireless device 130 is a wireless communication device such as a UE which is also known as e.g. mobile terminal, wireless terminal and/or mobile station, a mobile telephone, cellular telephone, or laptop with wireless capability, just to mention some further examples. The wireless device 130 may be, for example, portable, pocket-storable, hand-held, computer-comprised, or a vehicle-mounted mobile device, enabled to communicate voice and/or data, via the RAN, with another entity, such as a server, a laptop, a Personal Digital Assistant (PDA), or a tablet computer, sometimes referred to as a tablet with wireless capability, Machine-to-Machine (M2M) device, device equipped with a wireless interface, such as a printer or a file storage device, modem, or any other radio network unit capable of communicating over a wired or radio link in a communications system. The wireless device 130 is enabled to communicate wirelessly in the wireless communications network 100. The communication may be performed e.g., via a RAN and possibly one or more core networks, comprised within the wireless communications network 100.

The first communication device 101 is configured to communicate within the wireless communications network 100 with the second communication device 102 over a first radio link 151 in the first cell 141, and over a second radio link 152 in the second cell 142. Each of the other first communication devices in the group of first communication devices 110, e.g., the second first communication device 112, and the third first communication device 113, may communicate with the second communication device 102 over a respective radio first radio link the first cell 141, and over a respective second radio link in the third cell 143, and the fourth cell 144, respectively. This is not depicted in FIG. 10, so as to simplify the Figure.

Figure 11:
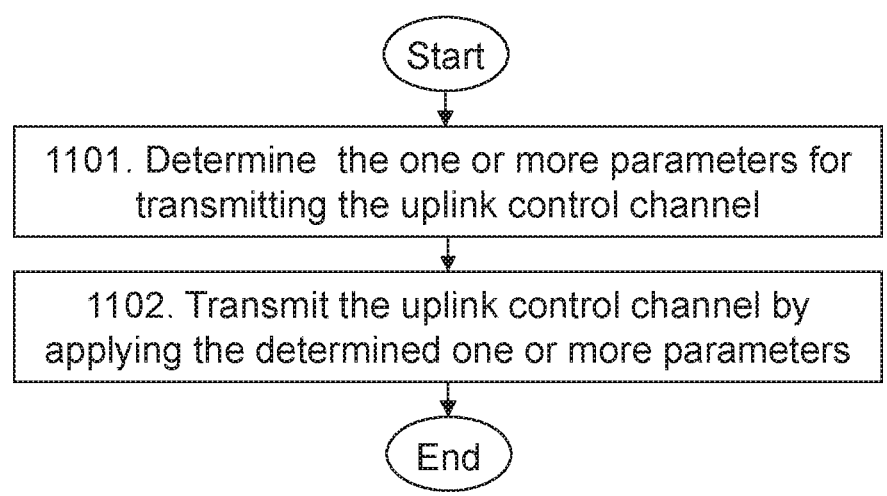
FIG. 11 is a flowchart depicting embodiments of a method in a first communication device, according to embodiments herein.

Embodiments of a method performed by the first communication device 101, will now be described with reference to the flowchart depicted in FIG. 11. The first communication device 101 operates in the wireless communications network 100.

An overview of the method will be described first. Later, a further detail description with particular examples will be provided.

Action 1101

At some point during the communications between the first communication device 101 and the second communication device 102, the first communication device 101 may need to send control information to the second communication device 102 on an uplink control channel and on an unlicensed band. The unlicensed band may also be referred to herein as an unlicensed spectrum. The uplink control channel may be at least one of: a) a Physical Uplink Control Channel, PUCCH, b) an sPUCCH, and c) an extended PUCCH, ePUCCH. In order for the first communication device 101 to transmit, e.g., control information, on the uplink control channel in the unlicensed band, the first communication device 101 may first need to perform channel sensing during a period of time. The channel sensing may be e.g., a Listen-Before-Talk (LBT) procedure. In order to perform the channel sensing while optimizing system performance, in this action, the first communication device 101 determines one or more parameters for transmitting on the uplink control channel in the unlicensed band to the second communication device 102 operating in the wireless communications network 100. The one or more parameters comprise an indication of a duration of a channel sensing period. The one or more parameters may be understood as one or more variables corresponding to or defining a channel sensing scheme, e.g., of different channel sensing schemes. For example, according to existing regulations, for ePUCCH, examples of applicable UL LBT schemes may be: 1) no UL LBT, if the ePUCCH follows the DL burst with a gap of at most 16 μs, 2) one-shot CCA of at least 25 μs duration, and 3) random backoff LBT with variable backoff duration. In another example, according to existing regulations, for sPUCCH, examples of applicable UL LBT schemes may be: 1) no UL LBT, based on short control signaling rules in ETSI EN BRAN, and 2) one-shot CCA of at least 25 μs duration.

By the first communication device 101 determining the one or more parameters, as opposed to e.g., applying a preconfigured duration of the channel sensing period, the first communication device 101 may optimize system performance, as it may adequately adapt the channel sensing duration to the time of transmission on the uplink control channel, e.g., within or after a TXOP, or the type of information transmitted, e.g., HARQ information vs. a Scheduling Request (SR).

The indication may comprise one of: a) a value of a random backoff counter, and b) an adaptation of a preconfigured value. As non-limiting examples of option b), the indication may be 3 bits used to indicate a LBT backoff counter from a certain set, or 1 bit to indicate whether the UE may apply short LBT with a fixed duration, e.g. 25 μs, or a full, exponential, Cat. 4, LBT. In some particular embodiments, the one or more parameters may relate to a use of a Cat 4 random backoff LBT for any of the first group of uplink control channels, e.g., PUCCH transmissions. As non-limiting examples of option a), the indication as an adaptation of the preconfigured value may be, e.g., a delta from a default assumption, such as subframe The determining the one or more parameters may comprise one of: a) receiving the one or more parameters from the second communication device 102, e.g., via the first radio link 151 or via the second radio link 152; and b) autonomously determining, e.g., calculating, the one or more parameters.

In some embodiments, the determining 1101 the one or more parameters may comprise receiving the one or more parameters from the second communication device 102 in one of: a) a downlink or uplink assignment corresponding to the uplink control channel, b) a Master Information Block (MIB), c) a System Information Block (SIB), d) a Common Physical Downlink Control Channel (CPDCCH), e) an unused Physical Hybrid Automatic Repeat reQuest Indicator Channel (PHICH), region in a Downlink (DL), message, and f) a semi-static configuration.

The time of transmission of the uplink control channel may be e.g., within a Maximum Channel Occupancy Time (MCOT) or after an MCOT. As explained in the background section, this may dictate, according to regulations, the percentage of time that the TXOP may be available for transmission. Accordingly, in some embodiments, the determining 1101 the one or more parameters may be based on a time of transmission on the uplink control channel. For example, within or after the MCOT.

Since the TXOP duration and boundary may be transparent to the first communication device 101, in some embodiments, wherein the determining 1101 the one or more parameters may comprise the first communication device 101 autonomously determining the one or more parameters, the determining 1101 may comprise determining Listen Before Talk (LBT) parameters based on an estimation of a TXOP by the first communication device 101. For example, the first communication device 101 may estimate the start of the TXOP based on the first subframe in which it may detect an initial signal or CRS or CPDCCH, and the end of the TXOP based on the DL/UL allocation indicated in the CPDCCH. The CPDCCH may be used by the second communication device 102 to signal the DL/UL allocation of upcoming subframes, and it may also be used to carry information regarding the one or more parameters.

In some embodiments, the first communication device 101 may want to transmit on the UL control channel without an association with DL activity. For example, this may happen when the first communication device 101 may want to transmit a SR that is not allocated by the second communication device 102. In embodiments wherein no DL activity may be associated with the uplink control channel, the duration may be determined to be a single Clear Channel Assessment (CCA) when the first communication device 101 has completed a full random backoff after a previous Transmission Opportunity (TXOP). By doing so, the first communication device 101 may save time and resources by avoiding performing a lengthier channel sensing period. This may be particularly useful in instances when the load is low, and the medium may be mostly idle.

In some embodiments, multiple wireless devices, such as the group of first communication devices 110, may have received data in a same unit of time-frequency resources, e.g., a subframe. When these devices may try to transmit their respective uplink control channels, they may collide with each other, or be unnecessarily delayed, due to the need to perform channel sensing. To avoid that the first communication devices in the group of first communication devices 110 block one another's channel sensing procedures, in some embodiments, the one or more parameters may be the same for the group of first communication devices 110 transmitting on the first group of uplink control channels in the same time resources. The group of first communication devices 110 may comprise the first communication device 101. The group of first communication devices 110 may be operating in the wireless communications network 100. The determined one or more parameters may comprise an indication that the group of first communication devices 110 are to perform channel sensing at the same time, e.g., that their channel sensing periods are aligned in time. As a result of this, the duration may be the same for the group of first communication devices 110, and therefore, it may be avoided that the first communication devices in the group of first communication devices 110 block one another's channel sensing procedures. That the duration is the same for the group of first communication devices 110 transmitting the first group of uplink control channels in the same time resources may be understood to mean that each of the first communication devices in the group of first communication devices 110 transmits their respective uplink control channel in the same time resource(s). This may be understood as that the first group of uplink control channels are multiplexed. The time resource may be, e.g., an OFDM symbol.

In some embodiments, wherein the receiving of the one or more parameters from the second communication device 102 may be in one of: the MIB and the SIB, the one or more parameters may be used by the first communication device 101 to transmit a Physical Random Access Channel (PRACH) preamble within a same unit of time-frequency resources, as an uplink control channel and/or an uplink shared channel, from other first communication devices 112, 113 in the group of first communication devices 110 transmitting on a first group of uplink control channels in the same time resources. The group of first communication devices 110 may comprise the first communication device 101. The unit of time-frequency resources may be e.g., a sub-frame. The uplink shared channel may be e.g., a PUSCH.

For example, in some embodiments, the one or more parameters may further comprise a deferral of transmitting on the uplink control channel in the time domain, in order to transmit a plurality of uplink control information in a same time instance, e.g., in order to bundle a plurality of ACK/NACK.

In some embodiments, wherein the transmitting on the uplink control channel may be in multiple carriers, the one or more parameters may further comprise a deferral of transmitting on the uplink control channel in one of the multiple carriers until Uplink (UL), transmission on adjacent carriers of the multiple carriers has been completed.

Another aspect addresses Dynamic Scheduling Request (D-SR) multiplexing. The network, e.g., the second communication device 102, may configure D-SRs to be sent only in sPUCCH opportunities and not ePUCCH. All D-SRs may therefore be confined together and may not cause conflicts in LBT parameters with ePUCCH/PUSCH subframes carrying HARQ/CSI feedback and user data, as sPUCCH resources may not share subframes with ePUCCH and PUSCH.

Alternatively, the network may configure the use of SRS to implicitly indicate a D-SR, with SRS in the last symbol of the UL subframe. Based on the cell's SRS subframe configuration, first communication devices in the group of first communication devices 110, e.g., UEs, transmitting PUSCH or ePUCCH in those subframes may puncture the last symbol, perhaps only on certain interlaces, leaving a gap for the D-SR only, i.e., SRS, transmission without PUSCH in the first 13 symbols, and there may be no LBT blocking at the start of the subframe between D-SR only and PUSCH/ePUCCH UEs.

According to the foregoing, dynamic Scheduling Requests (D-SRs) may be configured to be sent in one of: a) only in short Physical Uplink Control CHannel (sPUCCH) opportunities; and b) in time-frequency resources corresponding to a punctured Sounding Reference Signal (SRS).

Action 1102

In this Action, the first communication device 101 transmits, e.g., sends, on the uplink control channel to the second communication device 102 by applying the determined one or more parameters. That is, the first communication device 101 may transmit, e.g., control information, on the uplink control channel after performing channel sensing in the unlicensed band for the determined duration of the channel sensing period.

Transmission may be performed, e.g., over the second radio link 152.

The methods according to embodiments herein will now be further described with particular non-limiting examples. In the following discussion, a UE is used as an illustrative example of the first communication device 101 and an LTE eNB is used as an illustrative example of the second communication device 102. UEs are also used as illustrative examples of the second first communication device 102, and the third first communication device 113. Likewise, the PUCCH is used as an illustrative example of the uplink control channel, and LBT is used as an illustrative example of the channel sensing. LBT parameters are used as an example of the one or more parameters. HARQ ACK/NACK feedback is used as an example of uplink control information.

In some examples of embodiments herein, according to e.g., Action 1101 and 1302, methods of determining the appropriate LBT for ePUCCH may be based on an eNB indication. In one aspect of these examples, the eNB may indicate the appropriate LBT duration for the ePUCCH carrying HARQ ACK/NACKs in the DL assignment for the corresponding PDSCH transmission. In one example, according to e.g., Action 1102, the UE may apply the LBT parameters provided in said DL assignment and perform the corresponding transmission of said HARQ ACK/NACK in an UL subframe corresponding to said DL subframe. In one example, said corresponding UL subframe may occur four subframes after the subframes where it received said DL assignment. In another example, the eNB may indicate in said DL assignment in subframe n whether the UE may suppress the transmission of HARQ ACK/NACK feedback in said corresponding UL subframe. In one example said DL assignment may indicate in which later subframe, beyond said corresponding subframe, the UE may transmit the HARQ ACK/NACK feedback and said DL assignment may also provide the associated ePUCCH LBT parameters to be used in said later subframe. In such cases, while the default may be to send Uplink Control Information (UCI) in a subframe occurring at a pre-determined time after the corresponding DL subframe, i.e., N+4, examples of embodiments herein may comprise explicitly signaling the UE to suppress certain UCI transmissions in order to achieve bundling. Or, in the alternative examples of embodiments herein may comprise signalling the sub-frame number in which UCI may be sent, e.g., as a delta from the default assumption of N+4, or related to the DL transmission.

As a non-limiting example, 3 bits may be used to indicate a LBT backoff counter from the set {1,2,3,4,5,6,7} for all UEs transmitting ePUCCH in a particular subframe. In another non-limiting example, 1 bit may be used to indicate whether the UE may apply short LBT with a fixed duration, e.g. 25 µs, or a full, exponential, Cat. 4, LBT. If the eNB indicates the latter, the UE may derive the LBT parameters for said Cat. 4 LBT from a pseudo random number generator. In one example said pseudo random number generator may use the subframe number and/or the SFN as input parameter.

In one example, the configuration of the pseudo number generator may be done by higher layer configurations. In another example, according to Action 1302, this configuration may be carried by MIB or SIB.

A UE transmitting PRACH preambles may, according to Action 1302, receive the pseudo number generator parameters from MIB or SIB, in the case this PRACH preamble may be transmitted within the same sub-frame as ePUCCH and PUSCH from other UEs.

In another scenario, the LBT duration for ePUCCH outside a TXOP may be semi-statically configured to a fixed value, i.e., the one-shot CCA or backoff counter may be fixed since ePUCCH transmissions may not be retransmitted in the event of decoding failure at the eNB. In this case, 1 bit may be used by the eNB to indicate whether to apply a full random backoff or not. Similar methods may be applicable for indicating sPUCCH LBT parameters.

In another aspect of this embodiment, a Common PDCCH (CPDCCH) that may be used by the eNB to signal the DL/UL allocation of upcoming subframes may also carry information regarding ePUCCH LBT parameters, which may also be read by UEs that have not been scheduled for DL or UL transmissions and intend to send a Scheduling Request (SR). In another aspect, the unused Physical Hybrid ARQ Indicator CHannel (PHICH) region in DL subframes may be used to indicate ePUCCH LBT parameters.

In another aspect, ePUCCH LBT may be addressed for the case where there may be no DL activity and hence no eNB indications in the low-load scenario. After the last UL subframe transmission of a TXOP, a post-transmission Cat. 4 UL LBT may be performed, even if the UE transmit buffer may be empty. Once a new packet may arrive at the UE, a one-shot CCA may be performed before transmission, since a full Cat. 4 LBT may have already been performed. Therefore, in the low-load case with mostly idle medium and no DL activity, ePUCCH with a single CCA may be applied by all UEs that completed a post-transmission full random backoff after a previous TXOP. Alternatively, the previously-described pseudo-random number generator scheme for deriving LBT parameters may be applied in the case of no DL activity.

In a second example, a blind TXOP duration scheme may be adopted by UEs in order to autonomously determine if a short or regular LBT scheme may be applied for ePUCCH. For example, if no additional signaling for ePUCCH LBT parameters is included in the CPDCCH, then a UE may estimate the start of the TXOP based on the first subframe in which it may detect an initial signal or CRS or CPDCCH, and the end of the TXOP based on the DL/UL allocation indicated in the CPDCCH. The UE may then adopt an appropriate ePUCCH LBT scheme based on its estimate of the TXOP boundary.

In a third example, multicarrier transmission aspects may be taken into account for PUCCH LBT. For a MuLTEfire eNB with multiple unlicensed cells, each cell may perform independent LBT and have different TXOP durations. A UE that may be transmitting on one or more UL carriers may not simultaneously perform UL LBT on adjacent UL carriers due to RF leakage. The MF eNB may take this into account by indicating deferral of ePUCCH transmission on one or more UL carriers until UL transmissions on adjacent carriers may have been completed.

Figure 12:
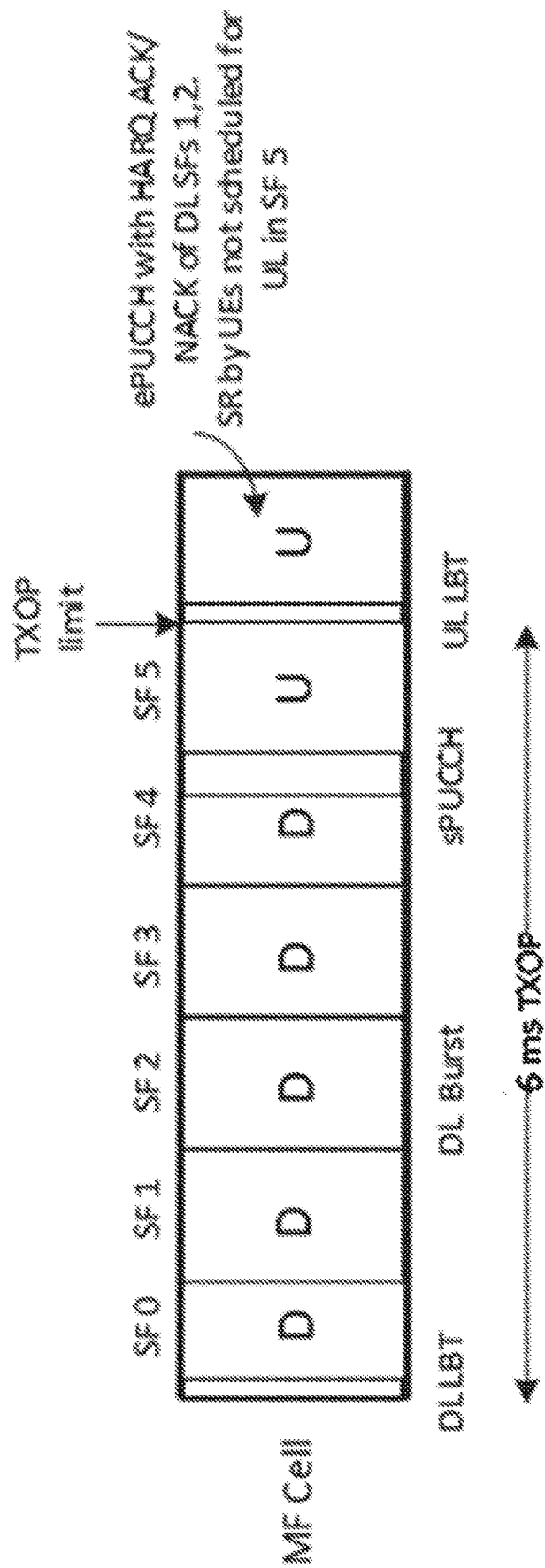
FIG. 12 is a schematic diagram illustrating an example of ePUCCH outside a TXOP limit of 6 ms.

An example scenario highlighting the issue of PUCCH LBT is shown in FIG. 12. FIG. 12 is a schematic diagram depicting an example of ePUCCH being transmitted outside a TXOP limit of 6 ms by a plurality of UEs. Here, a MOOT or TXOP limit of 6 ms is assumed as an example. In the depicted example, the TXOP comprises 4 full DL subframes, a partial DL subframe, and an sPUCCH followed by 1 UL subframe. Downlink is indicated as a "D". Uplink is indicated with a "U". The numbering of the subframes is indicated above the respective subframes: SF0, SF1, SF2, SF3, SF4 and SF5. An LBT in the DL (DL LBT) is performed in a MF Cell a the at the beginning of the TXOP. The final UL subframe contains multiplexed ePUCCH and PUSCH transmissions by several UEs, but since the final UL subframe falls outside the 6 ms MOOT, that is outside of the TXOP limit, all UEs transmitting ePUCCH here may be required to perform a full random backoff LBT, e.g. Cat. 4. These UEs, according to examples herein, may be also required to perform their LBT, indicated as "UL LBT", at the same time, and then start the ePUCCH or PUSCH transmission simultaneously in order to avoid blocking one another's LBT. A UE transmitting a Random Access preamble may also be required to perform its LBT at the same time.

Figure 13:
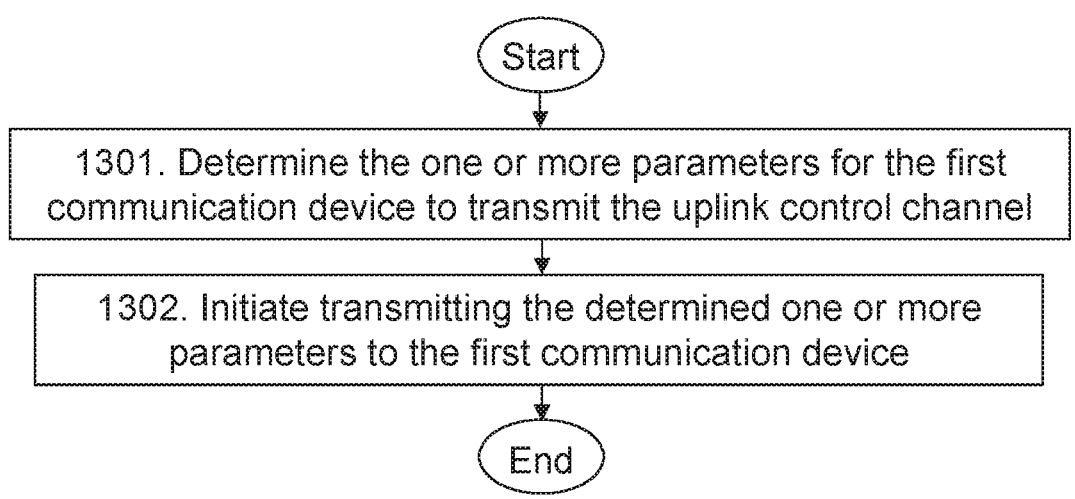
FIG. 13 is a flowchart illustrating an example of a method in a second communication device, according to embodiments herein.

Embodiments of a method performed by the second communication device 102, will now be described with reference to the flowchart depicted in FIG. 13. The second communication device 102 operates in the wireless communications network 100.

The detailed description of some of the following corresponds to the same references provided above, in relation to the actions described for the first communication device 101, and will thus not be repeated here.

Action 1301

In this Action, the second communication device 102 determines the one or more parameters for the first communication device 101 to transmit on the uplink control channel in the unlicensed band to the second communication device 102. As stated earlier, the first communication device 101 operates in the wireless communications network 100. The one or more parameters comprise an indication of the duration of the channel sensing period. The second communication device 102 may determine the one or more parameters in a similar way as described for the first communication device 101 in Action 1101. In the case of the second communication device 102, the determining 1101 the one or more parameters may comprise autonomously determining, e.g., calculating, the one or more parameters.

As stated earlier, the uplink control channel may be at least one of: a) the PUCCH, b) the sPUCCH, and c) the ePUCCH.

In some embodiments, similarly to what was explained for the first communication device 101, the determining 1301 the one or more parameters may be based on a time of transmission on the uplink control channel. The time of transmission of the uplink control channel may be e.g., within a Maximum Channel Occupancy Time (MCOT) or after an MCOT.

The channel sensing may be e.g., an LBT procedure.

The indication may comprise one of: a) the value of a random backoff counter; and b) the adaptation of the pre-configured value.

In some embodiments, no DL activity may be associated with the uplink control channel. In such embodiments, wherein no DL activity may be associated with the uplink control channel, the duration may be determined to be a single CCA, when the first communication device 101 may have completed the full random backoff after the previous TXOP.

As explained for the first communication device 101, D-SRs may be configured to be sent in one of: a) only in sPUCCH, opportunities; b) in time-frequency resources corresponding to a punctured SRS.

The determined one or more parameters may comprise an indication that the group of first communication devices 110 are to perform channel sensing at the same time, e.g., that their channel sensing periods are aligned in time. According to this, the one or more parameters may be the same for the group of first communication devices 110 transmitting on the first group of uplink control channels in the same time resources to the second communication device 102. The group of first communication devices 110 may comprise the first communication device 101. The group of first communication devices 110 may operate in the wireless communications network 100. In other words, in some embodiments, the second communication device 102 may determine the one or more parameters to transmit the uplink control channel in an unlicensed band to the second communication device 102, for the group of first communication devices 110 operating in the wireless communications network 100, the one or more parameters comprising an indication of a same duration of a channel sensing period.

That the duration is the same for the group of first communication devices 110 transmitting the first group of uplink control channels in the same time resources may be understood to mean that each of the first communication devices in the group of first communication devices 110 may transmit their respective uplink control channel in the same time resource(s). This may be understood as that the first group of uplink control channels may be multiplexed. The time resource may be, e.g., an OFDM symbol.

In some particular embodiments, the one or more parameters may relate to a use of a Cat 4 random backoff LBT for any of the first group of uplink control channels, e.g., PUCCH transmissions.

In some embodiments, the one or more parameters may further comprise the deferral of transmitting on the uplink control channel in the time domain, in order to transmit the plurality of uplink control information in the same time instance, e.g., in order to bundle a plurality of ACK/NACK.

In some embodiments wherein the transmitting on the uplink control channel may be in multiple carriers, the one or more parameters may further comprise a deferral of transmitting on the uplink control channel in one of the multiple carriers until the UL transmission on adjacent carriers of the multiple carriers has been completed.

Action 1302

In this Action, the second communication device 102 initiates transmitting, e.g., sending, the determined one or more parameters to the first communication device 101. That is, the second communication device 102 may either transmit the determined one or more parameters itself, or it may trigger another communication device to do so. For example, the second communication device 102 may determine the one or more parameters and then send them to another communication device which may then forward the one or more parameters to the first communication device 101.

Transmission may be performed, e.g., over any of the first radio link 151 and the second radio link 152.

In some embodiments, the initiating transmitting the determined one or more parameters may be performed in one of: a) the downlink or uplink assignment corresponding to the uplink control channel, b) the MIB, c) the SIB, d) the CPDCCH, e) the unused PHICH region in a DL message, and f) the semi-static configuration.

According to the foregoing, an advantage of embodiments herein is that embodiments herein relating to methods of transmitting on an uplink control channel in an unlicensed band, e.g., LBT methods for PUCCH, adhere to regulations and optimize MuLTEfire system performance.

An advantage of particular embodiments herein is that, by the first communication device determining the one or more parameters for transmitting the uplink control channel, such that the duration is the same for the group of first communication devices, the transmission of the uplink control channel by the group of first communication devices may be performed efficiently, avoiding that the first communication devices in the group of first communication devices block one another's channel sensing procedures. Therefore, transmission of uplink control channels in unlicensed spectrum, in a wireless communications network supporting multiplexing of different first communication devices is improved, as transmission is performed with a more efficient usage of time-frequency resources, and reduced latency.

Figure 14:
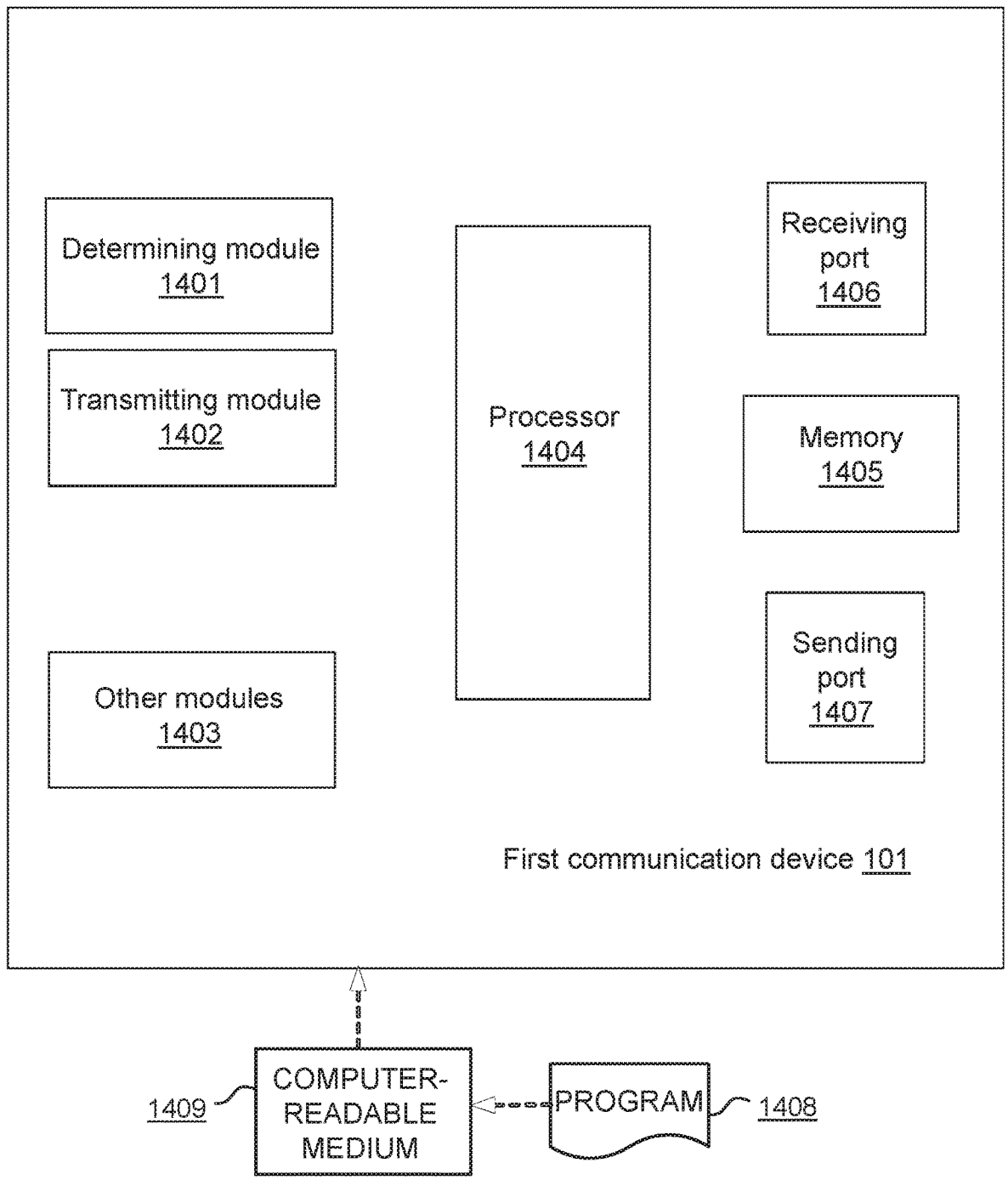
FIG. 14 is a schematic block diagram illustrating embodiments of a first communication device, according to embodiments herein.

To perform the method actions described above in relation to FIG. 11 and FIG. 12, the first communication device 101 may comprise the following arrangement depicted in FIG. 14. As stated earlier, the first communication device 101 is configured to operate in the wireless communications network 100.

The detailed description of some of the following corresponds to the same references provided above, in relation to the actions described for the first communication device 101, and will thus not be repeated here. For example, in some embodiments, the uplink control channel may be at least one of: a) the PUCCH, b) the sPUCCH, and c) the ePUCCH.

The first communication device 101 is further configured to, e.g., by means of a determining module 1401 configured to, determine the one or more parameters for transmitting on the uplink control channel in the unlicensed band to the second communication device 102 configured to operate in the wireless communications network 100, the one or more parameters comprising the indication of the duration of the channel sensing period. The determining module 1401 may be a processor 1404 of the first communication device 101, or an application running on such processor.

The one or more parameters may be the same for the group of first communication devices 110 configured to transmit on the first group of uplink control channels in the same time resources, the group of first communication devices 110 comprising the first communication device 101, and the group of first communication devices 110 being further configured to operate in the wireless communications network 100.

The indication comprises one of: a) the value of the random backoff counter; and b) the adaptation of the pre-configured value.

To determine the one or more parameters may be configured to be based on the time of transmission on the uplink control channel.

In some embodiments, to determine the one or more parameters may comprise one of: a) to receive the one or more parameters from the second communication device 102; and b) to autonomously determine the one or more parameters.

To determine the one or more parameters may comprise to receive the one or more parameters from the second communication device 102 in one of: a) the downlink or the uplink assignment corresponding to the uplink control channel, b) the MIB, c) the SIB, d) the CPDCCH, e) the unused PHICH region in the DL message, and f) the semi-static configuration.

In some embodiments, to receive the one or more parameters from the second communication device 102 may be in one of: the MIB and the SIB, and the one or more parameters may be configured to be used by the first communication device 101 to transmit a PRACH preamble within the same unit of time-frequency resources, as the uplink control channel and/or the uplink shared channel, from the other first communication devices 112, 113 in the group of first communication devices 110 configured to transmit on the first group of uplink control channels in the same time resources, the group of first communication devices 110 comprising the first communication device 101.

In some embodiments wherein no DL activity may be associated with the uplink control channel, the duration may be configured to be determined to be a single CCA, when the first communication device 101 has completed a full random backoff after a previous TXOP.

D-SRs may be configured to be sent in one of: a) only in the sPUCCH opportunities; and b) in time-frequency resources corresponding to a punctured SRS.

To determine the one or more parameters may comprise the first communication device 101 to autonomously determine the one or more parameters, and to determine may comprise to determine LBT parameters based on the estimation of the TXOP by the first communication device 101.

In some embodiments, to transmit on the uplink control channel may be in multiple carriers, and the one or more parameters may further comprise the deferral of transmitting on the uplink control channel in one of the multiple carriers until UL transmission on adjacent carriers of the multiple carriers has been completed.

The one or more parameters may further comprise the deferral of transmitting on the uplink control channel in the time domain, in order to transmit the plurality of uplink control information in the same time instance.

The first communication device 101 is further configured to, e.g., by means of a transmitting module 1402 configured to, transmit on the uplink control channel to the second communication device 102 by applying the determined one or more parameters. The transmitting module 1402 may be a processor 1404 of the first communication device 101, or an application running on such processor.

The first communication device 101 may comprise other modules 1403.

The embodiments herein may be implemented through one or more processors, such as a processor 1404 in the first communication device 101 depicted in FIG. 14, together with computer program code for performing the functions and actions of the embodiments herein. The program code mentioned above may also be provided as a computer program product, for instance in the form of a data carrier carrying computer program code for performing the embodiments herein when being loaded into the in the first communication device 101. One such carrier may be in the form of a CD ROM disc. It is however feasible with other data carriers such as a memory stick. The computer program code may furthermore be provided as pure program code on a server and downloaded to the first communication device 101.

The first communication device 101 may further comprise a memory 1405 comprising one or more memory units. The memory 1405 is arranged to be used to store obtained information, store data, configurations, schedulings, and applications etc. . . . to perform the methods herein when being executed in the first communication device 101.

In some embodiments, the first communication device 101 may receive information from the second communication device 102, through a receiving port 1406. In some embodiments, the receiving port 1406 may be, for example, connected to one or more antennas in first communication device 101. In other embodiments, the first communication device 101 may receive information from another structure in the wireless communications network 100 through the receiving port 1406. Since the receiving port 1406 may be in communication with the processor 1404, the receiving port 1406 may then send the received information to the processor 1404. The receiving port 1406 may also be configured to receive other information.

The processor 1404 in the first communication device 101 may be further configured to transmit or send information to e.g., the second communication device 102, through a sending port 1407, which may be in communication with the processor 1404, and the memory 1405.

The first communication device 101 may comprise an interface unit to facilitate communications between the first communication device 101 and other nodes or devices, e.g., the second communication device 102. The interface may, for example, include a transceiver configured to transmit and receive radio signals over an air interface in accordance with a suitable standard.

Those skilled in the art will also appreciate that the determining module 1401, the transmitting module 1402 and the other modules 1403 described above may refer to a combination of analog and digital modules, and/or one or more processors configured with software and/or firmware, e.g., stored in memory, that, when executed by the one or more processors such as the processor 1404, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SOC).

Also, in some embodiments, the different modules 1401-1403 described above may be implemented as one or more applications running on one or more processors such as the processor 1404.

Thus, the methods according to the embodiments described herein for the first communication device 101 may be respectively implemented by means of a computer program 1408, comprising instructions, i.e., software code portions, which, when executed on at least one processor 1404, cause the at least one processor 1404 to carry out the actions described herein, as performed by the first communication device 101. The computer program 1408 product may be stored on a computer-readable storage medium 1409. The computer-readable storage medium 1409, having stored thereon a computer program 1408, may comprise instructions which, when executed on at least one processor 1404, cause the at least one processor 1404 to carry out the actions described herein, as performed by the first communication device 101. In some embodiments, the computer-readable storage medium 1409 may be a non-transitory computer-readable storage medium, such as a CD ROM disc, or a memory stick. In other embodiments, the computer program 1408 product may be stored on a carrier containing the computer program 1408 just described, wherein the carrier is one of an electronic signal, optical signal, radio signal, or the computer-readable storage medium 1409, as described above.

Figure 15:
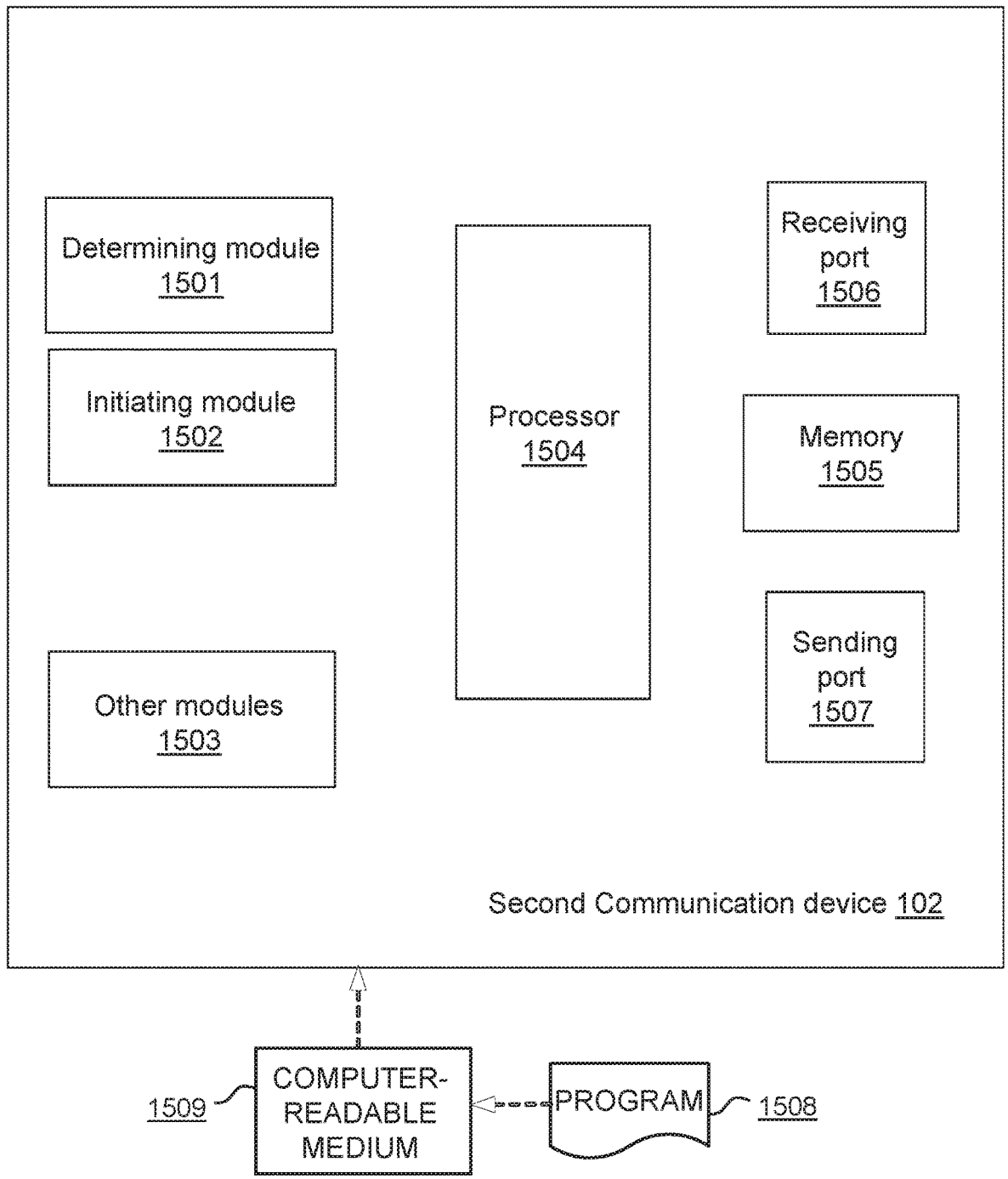
FIG. 15 is a schematic block diagram illustrating embodiments of a second communication device, according to embodiments herein.

To perform the method actions described above in relation to FIG. 13, the second communication device 102 may comprise the following arrangement depicted in FIG. 15. As stated earlier, the second communication device 102 is configured to operate in the wireless communications network 100.

The detailed description of some of the following corresponds to the same references provided above, in relation to the actions described for the first communication device 101, and will thus not be repeated here. For example, in some embodiments, the uplink control channel may be at least one of: a) the PUCCH, b) the sPUCCH, and c) the ePUCCH.

The second communication device 102 is further configured to, e.g., by means of a determining module 1501 configured to, determine the one or more parameters for the first communication device 101 to transmit on the uplink control channel in the unlicensed band to the second communication device 102, the first communication device 101 being configured to operate in the wireless communications network 100, and the one or more parameters comprising the indication of the duration of the channel sensing period. The determining module 1501 may be a processor 1504 of the second communication device 102, or an application running on such processor 1504.

The one or more parameters may be the same for the group of first communication devices 110 configured to transmit on the first group of uplink control channels in the same time resources to the second communication device 102, the group of first communication devices 110 comprising the first communication device 101, and the group of first communication devices 110 being further configured to operate in the wireless communications network 100.

The indication comprises one of: a) the value of the random backoff counter; and b) the adaptation of the pre-configured value.

To determine the one or more parameters may be configured to be based on the time of transmission on the uplink control channel.

To initiate transmitting 1302 the determined one or more parameters may be in one of: a) the downlink or the uplink assignment corresponding to the uplink control channel, b) the MIB, c) the SIB, d) the CPDCCH, e) the unused PHICH region in the DL message, and f) the semi-static configuration.

In some embodiments wherein no DL activity may be associated with the uplink control channel, the duration may be configured to be determined to be a single CCA, when the first communication device 101 has completed a full random backoff after a previous TXOP.

D-SRs may be configured to be sent in one of: a) only in the sPUCCH opportunities; and b) in time-frequency resources corresponding to a punctured SRS.

In some embodiments, to transmit on the uplink control channel may be in multiple carriers, and the one or more parameters may further comprise the deferral of transmitting on the uplink control channel in one of the multiple carriers until UL transmission on adjacent carriers of the multiple carriers has been completed.

The one or more parameters may further comprise the deferral of transmitting on the uplink control channel in the time domain, in order to transmit the plurality of uplink control information in the same time instance.

The second communication device 102 is further configured to, e.g., by means of an initiating module 1502 configured to, initiate transmitting the determined one or more parameters to the first communication device 101. The initiating module 1502 may be a processor 1504 of the second communication device 102, or an application running on such processor 1504.

The second communication device 102 may comprise other modules 1503.

The embodiments herein may be implemented through one or more processors, such as a processor 1504 in the second communication device 102 depicted in FIG. 15, together with computer program code for performing the functions and actions of the embodiments herein. The program code mentioned above may also be provided as a computer program product, for instance in the form of a data carrier carrying computer program code for performing the embodiments herein when being loaded into the in the second communication device 102. One such carrier may be in the form of a CD ROM disc. It is however feasible with other data carriers such as a memory stick. The computer program code may furthermore be provided as pure program code on a server and downloaded to the second communication device 102.

The second communication device 102 may further comprise a memory 1505 comprising one or more memory units. The memory 1505 is arranged to be used to store obtained information, store data, configurations, schedulings, and applications etc. to perform the methods herein when being executed in the second communication device 102.

In some embodiments, the second communication device 102 may receive information from the first communication device 101, through a receiving port 1506. In some embodiments, the receiving port 1506 may be, for example, connected to one or more antennas in second communication device 102. In other embodiments, the second communication device 102 may receive information from another structure in the wireless communications network 100 through the receiving port 1506. Since the receiving port 1506 may be in communication with the processor 1504, the receiving port 1506 may then send the received information to the processor 1504. The receiving port 1506 may also be configured to receive other information.

The processor 1504 in the second communication device 102 may be further configured to transmit or send information to e.g., the first communication device 101, through a sending port 1507, which may be in communication with the processor 1504, and the memory 1505.

The second communication device 102 may comprise an interface unit to facilitate communications between the second communication device 102 and other nodes or devices, e.g., the first communication device 101. The interface may, for example, include a transceiver configured to transmit and receive radio signals over an air interface in accordance with a suitable standard.

Those skilled in the art will also appreciate that the determining module 1501, the initiating module 1502 and the other modules 1503 described above may refer to a combination of analog and digital modules, and/or one or more processors configured with software and/or firmware, e.g., stored in memory, that, when executed by the one or more processors such as the processor 1504, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 1501-1503 described above may be implemented as one or more applications running on one or more processors such as the processor 1504.

Thus, the methods according to the embodiments described herein for the second communication device 102 may be respectively implemented by means of a computer program 1508, comprising instructions, i.e., software code portions, which, when executed on at least one processor 1504, cause the at least one processor 1504 to carry out the actions described herein, as performed by the second communication device 102. The computer program 1508 product may be stored on a computer-readable storage medium 1509. The computer-readable storage medium 1509, having stored thereon a computer program 1508, may comprise instructions which, when executed on at least one processor 1504, cause the at least one processor 1504 to carry out the actions described herein, as performed by the second communication device 102. In some embodiments, the computer-readable storage medium may be a non-transitory computer-readable storage medium, such as a CD ROM disc, or a memory stick. In other embodiments, the computer program product may be stored on a carrier containing the computer program just described, wherein the carrier is one of an electronic signal, optical signal, radio signal, or the computer-readable storage medium, as described above.

Examples related to any of the above described embodiments may be related to any of the following methods. Components from one embodiment may be tacitly assumed to be present in another embodiment and it will be obvious to a person skilled in the art how those components may be used in the other exemplary embodiments.

More specifically, the following are examples related to a first communication device, such as the first communication device 101 and examples related to a second communication device, such as the second communication device 102.

Figure 16:
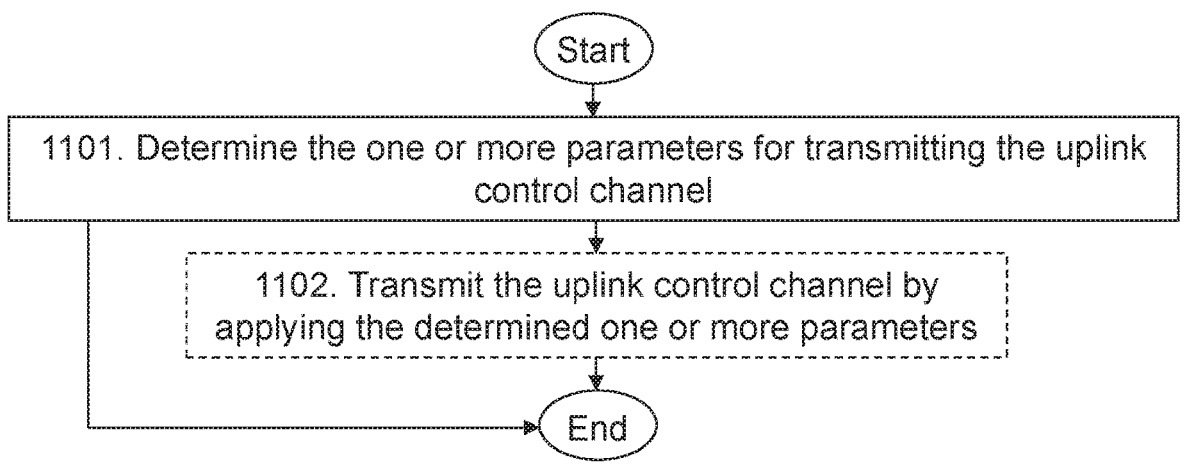
FIG. 16 is a flowchart depicting an example of a method in a first communication device, related to embodiments herein.

The first communication device examples relate to FIG. 16 and FIG. 14.

As shown in FIG. 16, a method performed by the first communication device 101 for the determining one or more parameters for transmitting the uplink control channel, the first communication device 101 operating in the wireless communications network 100 may comprise the action of:

Determining 1101 the one or more parameters for transmitting the uplink control channel in the unlicensed band to the second communication device 102 operating in the wireless communications network 100, the one or more parameters being the same for the group of first communication devices 110 transmitting a first group of uplink control channels in the same time resource(s), the group of first communication devices 110 comprising the first communication device 101 and operating in the wireless communications network 100. The first communication device 101 may be configured to perform this determining 1101 action, e.g. by means of a determining module 1401 within the first communication device 101.

In some embodiments, the method may further comprise the action of:

Transmitting 1102, e.g., sending, the uplink control channel to the second communication device 102 by applying the determined one or more parameters. The first communication device 101 may be configured to perform this transmitting 1102 action, e.g. by means of a transmitting module 1402 within the first communication device 101.

Figure 17:
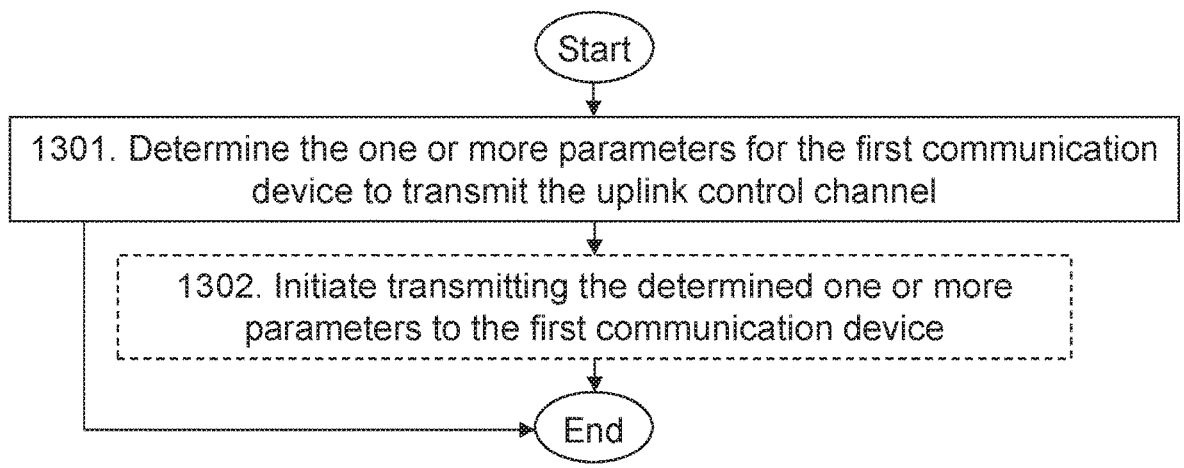
FIG. 17 is a flowchart illustrating an example of a method in a second communication device, related to embodiments herein.

The second communication device examples relate to FIG. 17 and FIG. 15.

As shown in FIG. 17, a method performed by the second communication device 102 for determining the one or more parameters for a first communication device 101 to transmit the uplink control channel, the first communication device 101 and the second communication device 102 operating in the wireless communications network 100 may comprise the action of:

Determining 1301 the one or more parameters for the first communication device 101 to transmit the uplink control channel in the unlicensed band to the second communication device 102, the one or more parameters being the same for the group of first communication devices 110 transmitting a first group of uplink control channels in the same time resources to the second communication device 102, the group of first communication devices 110 comprising the first communication device 101 and operating in the wireless communications network 100. The second communication device 102 may be configured to perform this determining 1301 action, e.g. by means of a determining module 1501 within the second communication device 102. For example, the one or more parameters may comprise an indication. The indication may be of a duration of a channel sensing period, the duration being the same for the group of first communication devices 110.

In some embodiments, the method may further comprise the action of:

Initiating transmitting 1302, e.g., sending, the determined one or more parameters to the first communication device 101. The second communication device 102 may be configured to perform this initiating transmitting 1302 action, e.g. by means of an initiating module 1502 within the second communication device 102.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention.

What is claimed is:

1. A method performed by a first communication device, the first communication device operating in a wireless communications network, the method comprising:
   receiving an uplink assignment from a second communication device operating in the wireless communications network;
   determining, based on the uplink assignment, one or more parameters for transmitting on an extended physical uplink control channel (ePUCCH) in an unlicensed band to the second communication device, the one or more parameters comprising an indication of a listen-before-talk (LBT) scheme for the ePUCCH, wherein said determining is based on a time of transmission on the ePUCCH;
   performing LBT according to the indicated LBT scheme for the ePUCCH; and
   transmitting on the ePUCCH to the second communication device as a consequence of the LBT;
   wherein the determining the one or more parameters comprises the first communication device autonomously determining the one or more parameters, and wherein the determining comprises determining LBT parameters based on an estimation of a transmission opportunity (TXOP) by the first communication device.

2. The method of claim 1, wherein the one or more parameters are the same for a group of first communication devices transmitting on a first group of ePUCCHs in the same time resources, the group of first communication devices comprising the first communication device, and the group of first communication devices operating in the wireless communications network.

3. The method of claim 1, wherein the indication comprises one of:
   a. a value of a random backoff counter;
   b. an adaptation of a preconfigured value.

4. The method of claim 1, wherein the one or more parameters comprise an indication of a duration of a channel sensing period, wherein no downlink (DL) activity is associated with the ePUCCH, and wherein the duration is determined to be a single Clear Channel Assessment (CCA) when the first communication device has completed a full random backoff after a previous Transmission Opportunity (TXOP).

5. The method of claim 1, further comprising configuring Dynamic Scheduling Requests (D-SRs) to be sent in one of:
   a. only in short Physical Uplink Control CHannel (sPUCCH) opportunities; and
   b. in time-frequency resources corresponding to a punctured Sounding Reference Signal (SRS).

6. The method of claim 1, wherein the transmitting on the ePUCCH is in multiple carriers, and wherein the one or more parameters further comprise a deferral of transmitting on the ePUCCH in one of the multiple carriers until Uplink (UL) transmission on adjacent carriers of the multiple carriers has been completed.

7. The method of claim 1, wherein the one or more parameters further comprise a deferral of transmitting on the ePUCCH in the time domain, in order to transmit a plurality of uplink control information in a same time instance.

8. The method of claim 1, further comprising:
   receiving information indicating an LBT scheme for transmitting on a short uplink control channel (sPUCCH) in the unlicensed band to the second communication device;
   performing LBT according to the indicated LBT scheme for the sPUCCH; and
   transmitting on the sPUCCH to the second communication device as a consequence of the LBT.

9. A method performed by a second communication device, the second communication device operating in a wireless communications network, the method comprising:
   determining one or more parameters for a first communication device to transmit on an extended physical uplink control channel (ePUCCH) in an unlicensed band to the second communication device, based on a time of transmission on the ePUCCH, the first communication device operating in the wireless communications network, and the one or more parameters comprising an indication of a listen-before-talk (LBT) scheme for the ePUCCH; and
   initiating transmitting the determined one or more parameters to the first communication device in an uplink assignment;
   wherein the one or more parameters further comprise a deferral of transmitting on the ePUCCH in the time domain, in order to transmit a plurality of uplink control information in a same time instance.

10. The method of claim 9, wherein the one or more parameters are the same for a group of first communication devices transmitting on a first group of ePUCCHs in the same time resources to the second communication device, the group of first communication devices comprising the first communication device, and the group of first communication devices operating in the wireless communications network.

11. The method of claim 9, wherein the indication comprises one of:
   a. a value of a random backoff counter;
   b. an adaptation of a preconfigured value.

12. The method of claim 9, wherein the initiating transmitting the determined one or more parameters is in one of:
   a. a downlink or uplink assignment corresponding to the ePUCCH,
   b. a Master Information Block (MIB),
   c. a System Information Block (SIB),
   d. a Common Physical Downlink Control Channel (CPDCCH),
   e. an unused Physical Hybrid Automatic Repeat reQuest Indicator Channel (PHICH) region in a Downlink (DL) message, and
   f. a semi-static configuration.

13. The method of claim 9, wherein the one or more parameters comprise an indication of a duration of a channel sensing period, wherein no downlink (DL) activity is associated with the ePUCCH, and wherein the duration is determined to be a single Clear Channel Assessment (CCA) when the first communication device has completed a full random backoff after a previous Transmission Opportunity (TXOP).

14. The method of claim 9, further comprising configuring Dynamic Scheduling Requests (D-SRs) to be sent in one of:
   a. only in short PUCCH (sPUCCH) opportunities;
   b. in time-frequency resources corresponding to a punctured Sounding Reference Signal (SRS).

15. The method of claim 9, wherein the transmitting on the ePUCCH is in multiple carriers, and wherein the one or more parameters further comprise a deferral of transmitting on the ePUCCH in one of the multiple carriers until Uplink (UL) transmission on adjacent carriers of the multiple carriers has been completed.

16. A first communication device configured to operate in a wireless communications network, the first communication device comprising a processor and memory configured to:
receive an uplink assignment from a second communication device operating in the wireless communications network;
determine, based on the uplink assignment, one or more parameters for transmitting on an extended physical uplink control channel (ePUCCH) in an unlicensed band to the second communication device the one or more parameters comprising an indication of a listen-before-talk (LBT) scheme for the ePUCCH, wherein said determining is based on a time of transmission on the ePUCCH;
perform LBT according to the indicated LBT scheme for the ePUCCH; and
transmit on the ePUCCH to the second communication device as a consequence of the LBT;
wherein the processor and memory is configured to autonomously determine the one or more parameters, and wherein the processor and memory is configured to determine LBT parameters based on an estimation of a transmission opportunity (TXOP) by the first communication device.

17. The first communication device of claim 16, wherein the indication comprises one of:
a. a value of a random backoff counter;
b. an adaptation of a preconfigured value.

18. The first communication device of claim 16, wherein the one or more parameters comprise an indication of a duration of a channel sensing period, wherein no downlink (DL) activity is associated with the ePUCCH, and wherein the duration is configured to be determined to be a single Clear Channel Assessment (CCA) when the first communication device has completed a full random backoff after a previous Transmission Opportunity (TXOP).

19. The first communication device of claim 16, wherein the processor and memory are further configured to:
receive information indicating an LBT scheme for transmitting on a short uplink control channel (sPUCCH) in the unlicensed band to the second communication device;
perform LBT according to the indicated LBT scheme for the sPUCCH; and
transmit on the sPUCCH to the second communication device as a consequence of the LBT.

20. A second communication device configured to operate in a wireless communications network, the second communication device comprising a processor and memory configured to:
determine one or more parameters for a first communication device to transmit on an ePUCCH in an unlicensed band to the second communication device, based on a time of transmission on the ePUCCH, the first communication device being configured to operate in the wireless communications network, and the one or more parameters comprising an indication of a listen-before-talk (LBT) scheme for the ePUCCH; and
initiate transmitting the determined one or more parameters to the first communication device in an uplink assignment;
wherein the one or more parameters further comprise a deferral of transmitting on the ePUCCH in the time domain, in order to transmit a plurality of uplink control information in a same time instance.

21. The second communication device of claim 20, wherein the processor and memory are configured to initiate transmitting the determined one or more parameters in one of:
a. a downlink or uplink assignment corresponding to the ePUCCH,
b. a Master Information Block (MIB),
c. a System Information Block (SIB),
d. a Common Physical Downlink Control Channel (CPDCCH),
e. an unused Physical Hybrid Automatic Repeat reQuest Indicator Channel (PHICH) region in a Downlink (DL) message, and
f. a semi-static configuration.

* * * * *

UNITED STATES PATENT AND TRADEMARK OFFICE
CERTIFICATE OF CORRECTION

PATENT NO. : 10,716,142 B2  
APPLICATION NO. : 15/844128  
DATED : July 14, 2020  
INVENTOR(S) : Mukherjee et al.

Page 1 of 2

It is certified that error appears in the above-identified patent and that said Letters Patent is hereby corrected as shown below:

In the Specification

In Column 1, Line 53, delete "pica" and insert -- pico --, therefor.

In Column 5, Line 59, delete "(HACK)" and insert -- (NACK) --, therefor.

In Column 5, Line 64, delete "sell-scheduling," and insert -- self-scheduling, --, therefor.

In Column 6, Line 3, delete "25 is," and insert -- 25 µs, --, therefor.

In Column 6, Line 42, delete "DL. LBT" and insert -- DL. An LBT --, therefor.

In Column 6, Line 43, delete "beginning" and insert -- beginning of --, therefor.

In Column 7, Line 32, delete "spectrum wireless" and insert -- spectrum in wireless --, therefor.

In Column 10, Line 41, delete "PUCCH," and insert -- PUSCH, --, therefor.

In Column 10, Line 55, delete "plink" and insert -- uplink --, therefor.

In Column 14, Line 26, delete "subframe" and insert -- subframe N+4. --, therefor.

In Column 16, Line 48, delete "101" and insert -- 101, --, therefor.

In Column 18, Line 32, delete "MOOT" and insert -- MCOT --, therefor.

In Column 18, Line 40, delete "a the at the" and insert -- at the --, therefor.

In Column 22, Line 18, delete "into the in the" and insert -- into the --, therefor.

Signed and Sealed this  
Nineteenth Day of January, 2021

Andrei Iancu  
*Director of the United States Patent and Trademark Office*

CERTIFICATE OF CORRECTION (continued)
U.S. Pat. No. 10,716,142 B2

In Column 23, Line 2, delete "(SOC)." and insert -- (SoC). --, therefor.

In Column 24, Line 45, delete "into the in the" and insert -- into the --, therefor.